United States Patent
Okamura et al.

(10) Patent No.: US 7,351,451 B2
(45) Date of Patent: *Apr. 1, 2008

(54) ANTHRAQUINONE COMPOUND, LIQUID CRYSTAL COMPOSITION, CELL AND DISPLAY DEVICE EMPLOYING THE SAME

(75) Inventors: Hisashi Okamura, Kanagawa (JP); Takashi Katoh, Kanagawa (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 302 days.

This patent is subject to a terminal disclaimer.

(21) Appl. No.: 10/485,457

(22) PCT Filed: Jul. 2, 2002

(86) PCT No.: PCT/JP02/06697

§ 371 (c)(1),
(2), (4) Date: Jul. 12, 2004

(87) PCT Pub. No.: WO03/014259

PCT Pub. Date: Feb. 20, 2003

(65) Prior Publication Data

US 2004/0232382 A1 Nov. 25, 2004

(30) Foreign Application Priority Data

Aug. 2, 2001 (JP) ............................. 2001-234465
Sep. 17, 2001 (JP) ............................. 2001-281650

(51) Int. Cl.
*C09K 19/52* (2006.01)
*C09K 19/60* (2006.01)
*C09B 1/56* (2006.01)

(52) U.S. Cl. ............... 428/1.1; 252/299.01; 252/299.1; 428/1.3; 552/234; 552/235

(58) Field of Classification Search ........... 252/299.01, 252/299.1; 428/1.1, 1.3; 552/234, 235
See application file for complete search history.

(56) References Cited

U.S. PATENT DOCUMENTS

| | | |
|---|---|---|
| 4,496,221 A | 1/1985 | Harrison et al. |
| 4,514,045 A | 4/1985 | Huffman et al. |
| 4,528,113 A | 7/1985 | Imazeki et al. |
| 4,596,666 A | 6/1986 | Blunck et al. |
| 4,841,057 A * | 6/1989 | Miura et al. ................. 546/183 |
| 4,921,959 A * | 5/1990 | Miura et al. ................. 546/152 |
| 5,006,276 A * | 4/1991 | Kaneko et al. .......... 252/299.1 |
| 6,033,742 A | 3/2000 | Iwanaga et al. |
| 7,220,466 B2 * | 5/2007 | Katoh et al. ................. 428/1.1 |
| 2005/0218375 A1 * | 10/2005 | Katoh et al. ............ 252/299.01 |
| 2006/0054860 A1 * | 3/2006 | Katoh et al. ............. 252/299.1 |
| 2006/0060822 A1 * | 3/2006 | Takaku et al. .......... 252/299.01 |
| 2006/0263543 A1 * | 11/2006 | Takaku et al. ................ 428/1.1 |

FOREIGN PATENT DOCUMENTS

| | | |
|---|---|---|
| EP | 103095 * | 3/1984 |
| EP | 0 108 472 A2 | 5/1984 |
| EP | 0 244 488 A1 | 11/1987 |
| EP | 0 348 519 A1 | 1/1990 |
| GB | 2 155 945 A | 10/1985 |
| JP | 2-178390 A | 7/1990 |
| WO | WO 03/014259 A2 | 2/2003 |

OTHER PUBLICATIONS

CAPLUS 1984: 408709.*
English abstract for EP 103095 from Derwent, 1984.*

* cited by examiner

*Primary Examiner*—Shean C Wu
(74) *Attorney, Agent, or Firm*—Buchanan Ingersoll & Rooney PC

(57) ABSTRACT

A liquid crystal composition comprising at least one liquid crystal compound and at least one anthraquinone compound represented by formula (1) below: Formula (1) (wherein $R^2$ to $R^8$ each independently represents a hydrogen or substituent; Het is a sulfur or oxygen; $B^1$ and $B^2$ each independently represents an optionally substituted arylene, heteroarylene, cycloalkan-diyl or cycloalken-diyl; $Q^1$ is a bivalent linking group; $C^1$ is an optionally substituted alkyl, cycloalkyl, alkoxy, alkokycarbonyl or acyloxy; p, q and r each represents a number from 0 to 5 and n is a number from 1 to 3 satisfying $3 \leq (p+r) \times n \leq 10$; when plural $\{(B^1)_p\text{-}(Q^1)_q\text{-}(B^2)_r\}$ are present, these may be the same or different) was disclosed

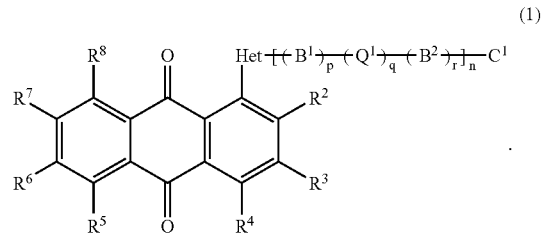

19 Claims, No Drawings

ANTHRAQUINONE COMPOUND, LIQUID CRYSTAL COMPOSITION, CELL AND DISPLAY DEVICE EMPLOYING THE SAME

TECHNICAL FIELD

The present invention belongs to a technical field of novel anthraquinone compounds and liquid crystal compositions that may preferably be used for liquid crystal displays, especially guest-host-type liquid crystal displays, and liquid crystal devices employing thereof.

BACKGROUND ART

There are known various types of liquid crystal devices For example, guest-host-type liquid crystal device has a cell having filled therein a liquid crystal composition which comprises liquid crystal as host and dichroic dye dissolved therein as guest. When a voltage is applied to the cell sufficient to rotate the liquid crystal molecules, the dye molecules rotate along with the liquid crystal molecules and allow changing of light absorption by the cell to thereby effect display. The reflective liquid crystal device employing guest-host mode is excellent in brightness.

Dichroic dyes used in liquid crystal devices are required to have appropriate absorption characteristics, high order parameters, high solubilities for host liquid crystal and excellent durabilities. The order parameter S is defined as "$S=(3\cos^2 \theta-1)/2$" when molecular long axes of molecules, which receive thermal wobble, are learning a time-average angle lag "$\theta$" from directors. "S" is 0.0 indicating that molecules are in absolute disordered state, on the other, "S" is 1.0 indicating that molecules are in ordered state in which molecular long axes and directors meet in alignment.

There are few known diachronic dyes which can bring about enough high order parameter, and this result in a lowering of the contrast of guest-host-type displays. Some azo and anthraquinone dyes are known as dichroic dyes bringing about relatively high order parameters. For example, some anthraquinone compounds are disclosed in JP-A-62-64886, JP-A-2-178390 and JP-A-10-260386 (the term "JP-A" as used herein means an "unexamined published Japanese patent application"). However, solubilities of such dyes for host liquid crystal, especially fluorine-containing liquid crystal which has often been used in recent years, are so low that liquid crystal displays employing such dyes cannot have sufficient high optical densities.

It is therefore an object of the present invention to provide a liquid crystal composition and a liquid crystal cell which can contribute to improvement of displaying contrast and bring about high optical density, when employed in displaying devices. Another object of the present invention is to provide novel anthraquinone dyes which are useful as dichroic dyes, and in especial novel anthraquinone dyes bringing about high order parameters and having high solubilities for host crystal liquid.

DISCLOSURE OF INVENTION

In one embodiment, this invention relates to a liquid crystal composition comprising liquid crystal compound and at least one anthraquinone compound represented by formula (1) below:

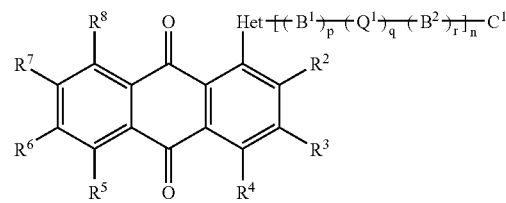

Formula (1)

(wherein $R^2$, $R^3$, $R^4$, $R^5$, $R^6$) $R^7$ and $R^8$ each independently represents a hydrogen or substituent; Het is a sulfur or oxygen; $B^1$ and $B^2$ each independently represents an optionally substituted arylene, heteroarylene, cycloalkan-diyl or cycloalken-diyl and when plural $B^1$ and $B^2$ are present, these may be the same or different; $Q^1$ is a bivalent linking group and when plural $Q^1$ are present, these may be the same or different; $C^1$ is an optionally substituted alkyl, cycloalkyl, alkoxy, alkokycarbonyl or acyloxy; p, q and r each represents a number from 0 to 5 and n is a number from 1 to 3 satisfying $3 \leq (p+r) \times n \leq 10$; when plural $\{(B^1)_p\text{-}(Q^1)_q\text{-}(B^2)_r\}$ are present, these may be the same or different).

As preferred embodiments of the present invention, there are provided the liquid crystal composition wherein Het is a sulfur atom; the liquid crystal composition wherein the anthraquinone compound is represented by formula (2) below:

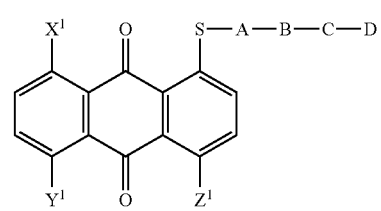

Formula (2)

(where S is a sulfur atom; A, B and C each independently represents an optionally substituted arylene, heteroarylene or cyclohexandiyl; D is an optionally substituted alkyl, cycloalkyl, alkoxy, alkoxycarbonyl or acyloxy; $X^1$, $Y^1$ and $Z^1$ each independently represents a hydrogen atom, halogen atom, hydroxyl, optionally substituted amino, arylthio or heteroarylthio, provided $X^1$, $Y^1$ and $Z^1$ are not all hydrogen; preferably at least one of $Z^1$, $X^1$ and $Y^1$ represents an alkylamino); the liquid crystal composition wherein the anthraquinone compound is represented by formula (3) below:

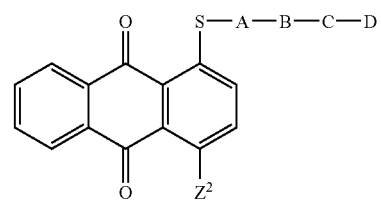

Formula (3)

(where S, A, B, C and D are as defined above with respect to Formula (2), $Z^2$ represents an optionally substituted arylthio or heteroarylthio); the liquid crystal composition of Formula (1), wherein the anthraquinone compound is represented by formula (4) below:

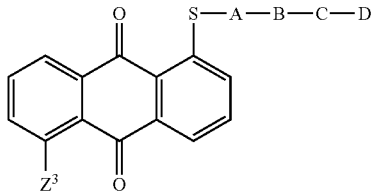

Formula (4)

(where S, A, B, C and D are as defined above with respect to Formula (2), $Z^3$ represents an optionally substituted arylthio or heteroarylthio); the liquid crystal composition wherein the anthraquinone compound is represented by formula (5) below:

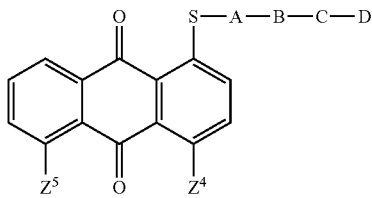

Formula (5)

(where S, A, B, C and D are as defined above with respect to Formula (2), $Z^4$ and $Z^5$ each independently represents an optionally substituted arylthio or heteroarylthio); the liquid crystal composition of Formula (1), wherein the anthraquinone compound is represented by formula (6) below:

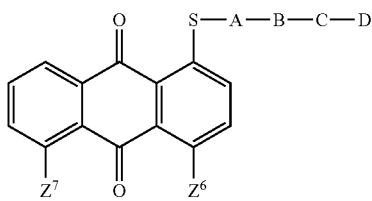

Formula (6)

(where S, A, B, C and D are as defined above with respect to Formula (2), $Z^6$ and $Z^7$ each independently represents an optionally substituted arylthio or heteroarylthio).

In another embodiment, this invention relates to a liquid crystal cell comprising a liquid crystal layer containing a liquid crystal composition which comprises at least one liquid crystal compound and at least one anthraquinone compound represented by said formula (1).

In another embodiment, this invention related to a display device comprising a liquid crystal cell comprising a liquid crystal layer containing a liquid crystal composition which comprises at least one liquid crystal compound and at least one anthraquinone compound represented by said formula (1).

In another embodiment, this invention relates to an anthraquinone compound represented by formula (1-a) below:

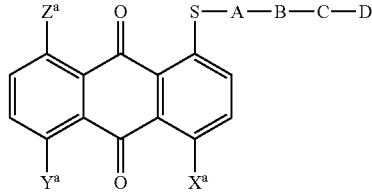

Formula (1-a)

(where S is a sulfur atom; A, B and C each independently represents an optionally substituted arylene, heteroarylene or cyclohexandiyl; D represents an optionally substituted alkyl, cycloalkyl, alkoxy, alkoxycarbonyl or acyloxy; $X^a$, $Y^a$ and $Z^a$ each independently represents a hydrogen atom, optionally substituted amino, arylthio or heteroarylthio, provided at least one of $X^a$, $Y^a$ and $Z^a$ represents an optionally substituted arylthio).

As preferred embodiments of the present invention, there are provided the anthraquinone compound wherein $X^a$ and $Z^a$ are hydrogen, and $Y^a$ is an optionally substituted arylthio; the anthraquinone compound wherein $X^a$, $Y^a$ and $Z^a$ each independently represents an optionally substituted arylthio; the anthraquinone compound wherein $Y^a$ and $Z^a$ are each independently optionally substituted alkylamino or arylamino, and $X^a$ is a hydrogen or an optionally substituted arylthio.

BEST MODE FOR CARRYING OUT THE INVENTION

The present invention is described in detail below. In the present Specification, the symbol "-" indicates a range having as minimum and maximum the two numbers before and after it, inclusive.

The anthraquinone compound represented by formula (1) will be described first.

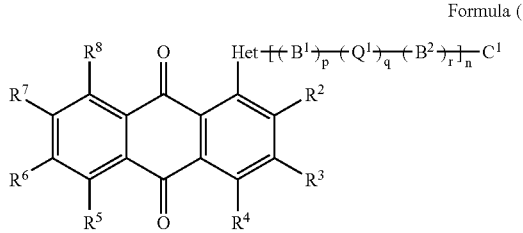

Formula (1)

In the formula (1), $R^2$, $R^3$, $R^4$, $R^5$, $R^6$, $R^7$ and $R^8$ each independently represents a hydrogen or substituent. Generalizing now the substituent as substituent group "V", such substituent group "V" includes halogen atoms (e.g., chlorine, bromine, iodine, fluorine); mercapto group; cyano group; carboxyl group; phosphoric acid group; sulfonic acid group; hydroxyl group; carbamoyl groups having $C_{1-10}$, preferably $C_{2-8}$, more preferably $C_{2-5}$ (e.g., methylcarbamoyl, ethylcarbamoyl, morpholinocarbamoyl); sulfamoyl groups having $C_{0-10}$, preferably $C_{2-8}$, and more preferably $C_{2-5}$ (e.g., methylsulfamoyl, ethylsulfamoyl, piperidinosulfamoyl); nitro group; alkoxy groups having $C_{1-20}$, preferably $C_{1-10}$, more preferably $C_{1-8}$ (e.g., methoxy, ethoxy, 2-methoxyethoxy, 2-phenylethoxy); aryloxy groups having $C_{6-20}$, preferably $C_{6-12}$, more preferably $C_{6-10}$ (e.g., phenoxy, p-methylphenoxy, p-chlorophenoxy, naphthoxy); acyl groups having $C_{1-20}$, preferably $C_{2-12}$, more preferably $C_{2-8}$ (e.g., acetyl, benzoyl, trichloroacetyl); acyloxy groups having $C_{1-20}$, preferably $C_{2-12}$, more preferably $C_{2-8}$ (e.g., acetyloxy, benzoyloxy); acylamino groups having $C_{1-20}$, preferably $C_{2-12}$, more preferably $C_{2-8}$ (e.g., acetylamino); sulfonyl groups having $C_{1-20}$, preferably $C_{1-10}$, more preferably $C_{1-8}$ (e.g., methanesulfonyl, ethanesulfonyl, benzenesulfonyl); sulfinyl groups having $C_{1-20}$, preferably $C_{1-10}$, more preferably $C_{1-8}$ (e.g., methanesulfinyl, ethanesulfinyl, benzenesulfinyl); sulfonylamino groups having $C_{1-20}$, preferably $C_{1-10}$, more preferably $C_{1-8}$ (e.g., methanesulfonylamino, ethanesulfonylamino, benzenesulfonylamino); amino groups having $C_{0-20}$, preferably $C_{1-12}$, more preferably $C_{1-8}$ (e.g., amino, methylamino, dimethylamino, benzylamino, anilino, diphenylamino, ethylamino, butylamino, phenetylamino, methoxyethylamino, ethoxyethylamino, p-methylphenylamino, m-methylphenylamino, o-methylphenylamino, p-chlorophenylamino, p-fluorophenylamino, p-trifluorophenylamino, o,o'-dimethylphenylamino); ammonium groups having $C_{0-15}$, preferably $C_{3-10}$, more preferably $C_{3-6}$ (e.g., trimethylammonium, triethylammonium); hydrazino groups having $C_{0-15}$, preferably $C_{1-10}$, more preferably $C_{1-6}$ (e.g., trimethylhydrazino); ureido groups having $C_{1-15}$, preferably $C_{1-10}$, more preferably $C_{1-6}$ (e.g., ureido, N,N-dimethylureido); imido groups having $C_{1-15}$, preferably $C_{1-10}$, more preferably $C_{1-6}$ (e.g., succinimide); alkylthio groups having $C_{1-20}$, preferably $C_{1-12}$, more preferably $C_{1-8}$ (e.g., methylthio, ethylthio, propylthio); arylthio groups having $C_{6-80}$, preferably $C_{6-40}$, more preferably $C_{6-30}$ (e.g., phenylthio, p-methylphenylthio, p-chlorophenylthio, 1-naphtylthio, 2-naphtylthio, 4-propylcyclohexyl-4'-biphenylthio, 4-butylcyclohexyl-4'-biphenylthio, 4-penthylcycloxexyl-4'-biphenylthio, 4-propylphenyl-2-ethynyl-4'-biphenyltio); heteroarylthio groups having $C_{1-80}$, preferably $C_{1-40}$, more preferably $C_{1-30}$ (e.g., 2-pyridylthio, 3-pyridylthio, 4-pyridylthio, 2-quinolylthio, 2-furylthio, 2-pyrrolylthio); alkoxycarbonyl groups having $C_{2-20}$, preferably $C_{2-12}$, more preferably $C_{2-8}$ (e.g., methoxycarbonyl, ethoxycarbonyl, 2-benzyloxycarbonyl); aryloxycarbonyl groups having $C_{6-20}$, preferably $C_{6-12}$, more preferably $C_{6-10}$ (e.g., phenoxycarbonyl); unsubstituted alkyl groups having $C_{1-18}$, preferably $C_{1-10}$, more preferably $C_{1-5}$ (e.g., methyl, ethyl, propyl, butyl); substituted alkyl groups having $C_{1-18}$, preferably $C_{1-10}$, more preferably $C_{1-5}$ {e.g., hydroxymethyl, trifluoromethyl, benzyl, carboxyethyl, ethoxycarbonylmethyl, acethylaminomethyl, also including unsaturated hydrocarbon groups having $C_{2-18}$, preferably $C_{3-10}$, more preferably $C_{3-5}$ (e.g, vinyl, ethynyl, 1-cyclohexyenyl, benzylidyne, benzyliden); substituted or unsubstituted aryl groups having $C_{6-20}$, preferably $C_{6-15}$, more preferably $C_{6-10}$ (e.g., phenyl, naphthyl, p-carboxyphenyl, p-nitrophenyl, 3,5-dichlorophenyl, p-cyanophenyl, m-fluorophenyl, p-tolyl); and substituted or unsubstituted heterocyclic groups having $C_{1-20}$, preferably $C_{2-10}$, more preferably $C_{4-6}$ (e.g., pyridyl, 5-methylpyridyl, thienyl, furyl, morpholino, tetrahydrofurfuryl). Structures having condensed benzene rings or naphthalene rings are also allowable. Any substituents selected from above substituent group "V" may be substituted by any substituents selected from above substituent group "V".

The substituent groups represented by $R^2$, $R^3$, $R^4$, $R^5$, $R^6$, $R^7$ and $R^8$ are preferably alkyl groups, aryl groups, alkoxy groups, aryloxy groups, halogen atoms, amino, substituted amino groups, hydoroxy, alkylthio groups or arylthio groups selected from the substituent group "V".

It is preferable that $R^2$, $R^3$, $R^4$, $R^5$, $R^6$, $R^7$ and $R^8$ respectively represents a hydrogen atom, alkyl group, aryl group, alkoxy group, halogen atom, amino, substituted amino group, hydroxy, alkylthio group or arylthio group; more preferable that $R^2$, $R^3$, $R^4$, $R^5$, $R^6$, $R^7$ and $R^8$ respectively represents a hydrogen atom, amino, substituted amino group, hydroxy, alkylthio group or arylthio group.

In the formula (1), Het represents an oxygen atom or sulfur atom, preferably a sulfur atom.

In the formula (1), $B^1$ and $B^2$ respectively represents an arylene, heteroarylene, cycloalkan-diyl or cycloalken-diyl group. The arylene groups represented by $B^1$ and $B^2$ desirably have 6-20 carbon atoms. Preferred examples of the arylene groups are phenylene, naphtylene and anthrylene, especially preferred example is 1,4-phenylene. The heteroarylene groups represented by $B^1$ and $B^2$ desirably have 1-20 carbon atoms. Preferred examples of the heteroarylene groups are pyridin-diyl, quinolin-diyl, isoquinolin-diyl, pyrimidylene, pyrazin-diyl, thiophenylene, furanylene, oxazolylene, thiazolylene, imidazolylene, pyrazolylene, oxadiazolylene, thiadiazolylene, triazolylenephenylene and heteroarylene groups having condensed structures thereof. Preferred examples of the cycloalkan-diyl and cycloalken-diyl groups represented by $B^1$ and $B^2$ are cyclohexane-1,2-diyl, cyclohexane-1,3-diyl, cyclohexane-1,4-diyl, and cyclopentane-1,3-diyl, especially preferred examples is (E)-cyclohexane-1,4-diyl.

$B^1$ and $B^2$ may have any substituent groups selected from the substituent group "V". When p is 2 or more, in other words, plural $B^1$ are present, these may be the same or different. When r is 2 or more, in other words, plural $B^2$ are present, these may be the same or different.

In the formula (1), $Q^1$ represents a linkage group which may include carbon atoms, nitorogen atoms, sulfur atoms or oxygen atoms. The preferred examples of the linkage group represented by $Q^1$ are alkylene groups having $C_{1-20}$ (e.g., methylene, ethylene, propylene, butylenes, pentylene, cyclohexyl-diyl), alkenylene groups having $C_{2-20}$ (e.g., ethenylene), alkynylene groups having $C_{2-20}$ (e.g., ethynylene), amido (—C(=O)NH—), oxy (—O—), carboxylato (—C(=O)O—), sulfoamido (—S(=O)$_2$NH—), sulfoxylato (—S(=O)$_2$O—), ureido (—NHC(=O)NH—), sulfonyl (—S(=O)$_2$—), sulfinyl (—S(=O)—), thioxy (—S—), carbonyl (—c(=O)—), —NR—(R represents a hydrogen atom, alkyl group or aryl group), azo (—N=N—), azoxy (—N$_2$(O)—), heterocyclo-diyl group (e.g., piperazine-1,4-diyl), and the groups having $C_{0-20}$, which is composed by two or more groups selected from above-mentioned examples.

$Q^1$ may have any substituent groups selected from the substituent group "V". When q is 2 or more, in other words, plural $Q^1$ are present, these may be the same or different.

In the formula (1), $C^1$ is an optionally substituted alkyl, cycloalkyl, alkoxy, alkoxycarbonyl or acyloxy. Preferred examples of $C^1$ are alkyl or cycloalkyl groups having $C_{1-30}$, preferably $C_{1-12}$, more preferably $C_{1-8}$ (e.g. ,methyl, ethyl, propyl, butyl, t-butyl, i-butyl, s-butyl, pentyl, t-pentyl, hexyl, heptyl, octyl, cyclohexyl, 4-methycyclohexyl, 4-ethylcyclohexyl, 4-propylcyclohexyl, 4-butylcyclohexyl, 4-pentylcyclohexyl, hydroxymethyl, trifluoromethyl, benzyl); alkoxy groups having $C_{1-20}$, preferably $C_{2-12}$, more preferably $C_{2-8}$ (e.g., methoxy, ethoxy, 2-methoxyethoxy, 2-phenylethoxy); acyloxy groups having $C_{1-20}$, preferably $C_{2-12}$, more preferably $C_{2-8}$ (e.g., acethyloxy, benzoyloxy); alkoxycarbonyl groups having $C_{2-20}$, preferably $C_{2-12}$, more preferably $C_{2-8}$ (e.g., methoxycarbonyl, ethoxycarbonyl, 2-benzyloxycarbonyl). $C^1$ is more preferably an optionally substituted alkyl or alkoxy, further more preferably ethyl, propyl, butyl, pentyl, hexyl or trifuloromethoxy.

$C^1$ may have any substituent groups selected from the substituent group "V".

p, q and r respectively represents a number from 0 to 5 and n is a number from 1 to 3, satisfying $3 \leq (p+r) \times n \leq 10$. When n is 2 or more, namely, plural $\{(B^1)_p\text{-}(Q^1)_q\text{-}(B^2)_r\}$ are present, these plural $\{(B^1)_p\text{-}(Q^1)_q\text{-}(B^2)_r\}$ may be the same or different.

Preferred combinations of p, q and r are (1) to (13) as shown below:
(1) P=3, q=0, r=1 and n=1;
(2) P=4, q=0, r=0 and n=1;
(3) P=5, q=0, r=0 and n=1;
(4) P=2, q=1, r=1 and n=1;
(5) P=1, q=1, r=2 and n=1;
(6) P=3, q=1, r=1 and n=1;
(7) P=1, q=1, r=3 and n=1;
(8) P=2, q=1, r=2 and n=1;
(9) P=1, q=1, r=1 and n=3;
(10) P=0, q=1, r=3 and n=1;
(11) P=0, q=1, r=2 and n=2;
(12) P=1, q=1, r=2 and n=2;
(13) P=2, q=1, r=1 and n=2.

Especially preferred combinations are (1) P=3, q=0, r=1 and n=1; (2) P=4, q=0, r=0 and n=1; (4) P=2, q=1, r=1 and n=1.

The substituent represented by the formula of $-\{(B^1)_p\text{-}(Q^1)_q\text{-}(B^2)_r\}_n\text{-}C^1$ preferably containing structures exhibiting liquid crystallinity. The structures may exhibit any kind of liquid crystallinity, however, preferably nematic, smectic, or discotic liquid crystallinity, more preferably nematic liquid crystallinity. Examples of structures exhibiting liquid crystals are shown in "Bunshikouzou to ekishosei (Molecular Structure and Liquid Crystallinity)", third chapter of "Ekisho Binran (Handbook of Liquid Crystal)" published by Maruzen in 2000, edited by Society of editing handbook of Liquid crystal.

Specific examples of the substituent represented by the formula of $-\{(B^1)_p\text{-}(Q^1)_q\text{-}(B^2)_r\}_n\text{-}C^1$ will be listed below, which by no means restricts the present invention. In the following formulae, wave lines denote portions of attaching to Het.

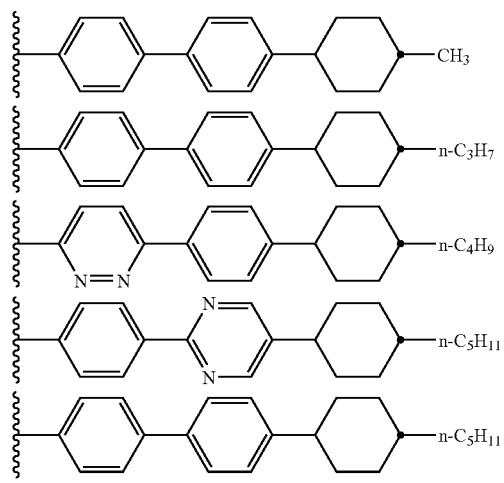

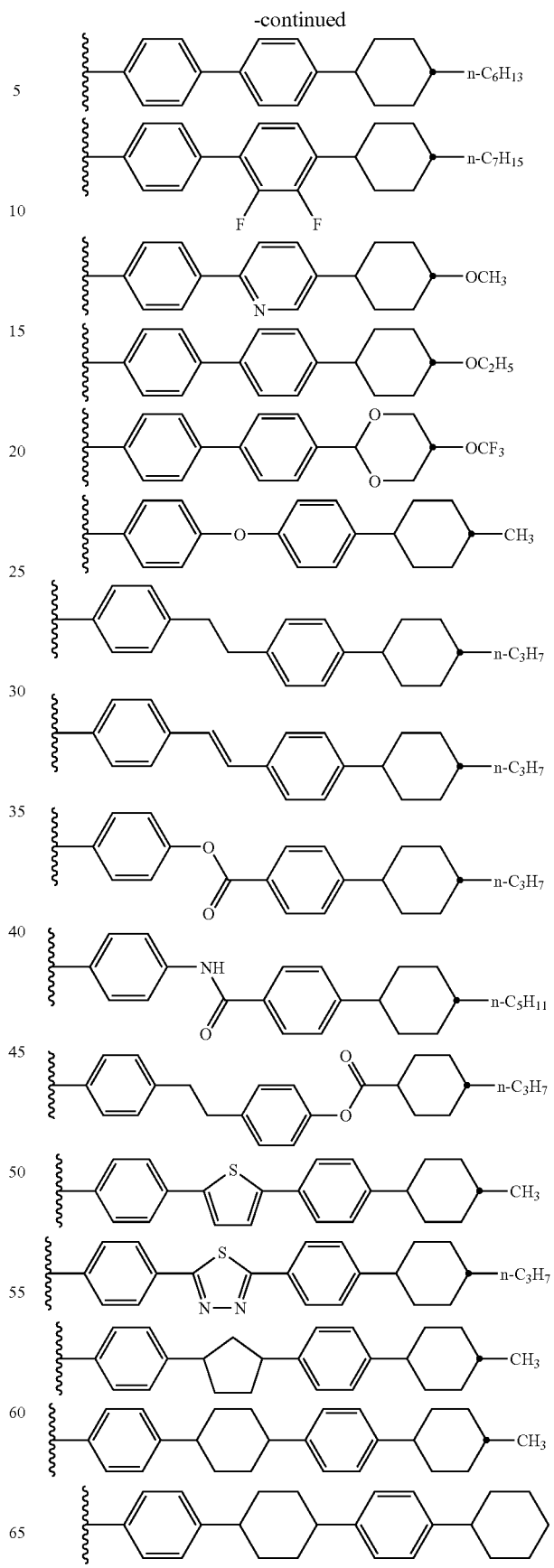

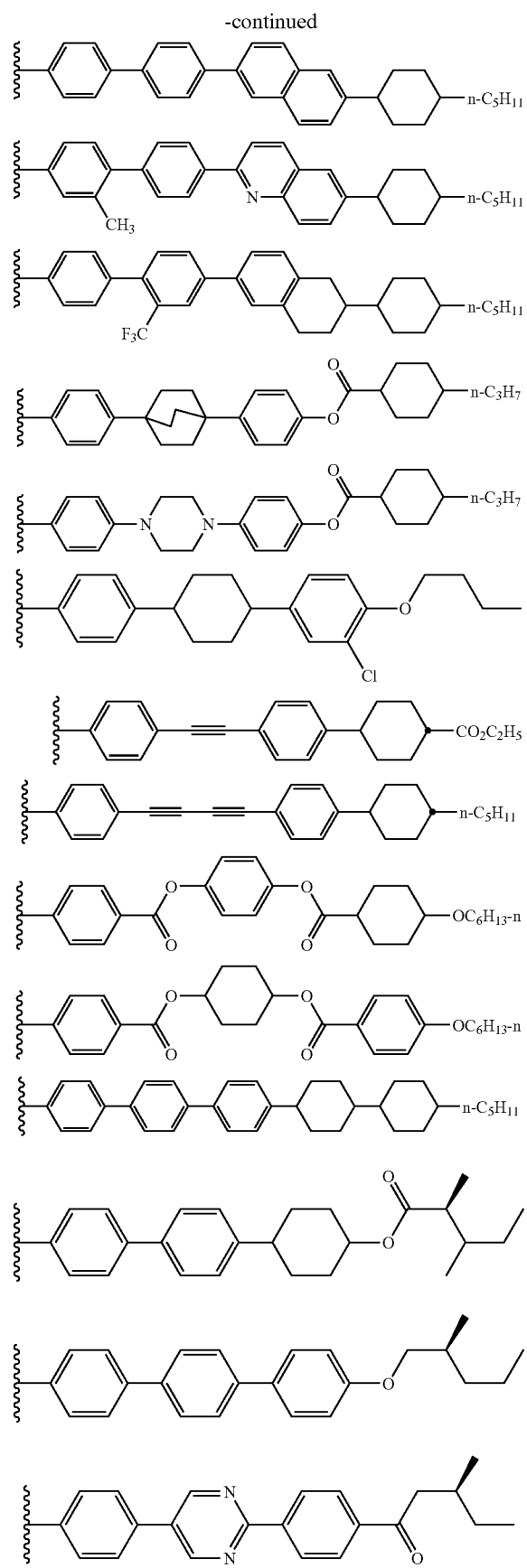
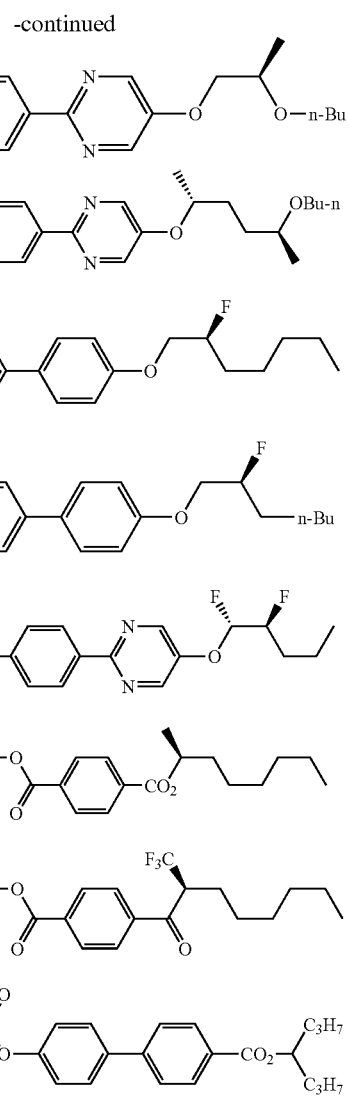

In the formula (1), at least one of $R^2$-$R^8$ may be a substituent represented by the formula of -$\{(B^1)_p$-$(Q^1)_q$-$(B^2)_r\}_n$-$C^1$. At least one of $R^4$, $R^5$ and $R^8$ is preferably a substituent represented by the formula of -$\{(B^1)_p$-$(Q^1)_q$-$(B^2)_r\}_n$-$C^1$. A number of substituent "-$\{(B^1)_p$-$(Q^1)_q$-$(B^2)_r\}_n$-$C^1$" contained in an anthraquinone compound represented by the formula (1) may be 1-8, preferably 1-6, more preferably 1-4.

As one preferred embodiment of this invention, there is provided the anthraquinone compound represented by a formula (2) bellow:

Formula (2)

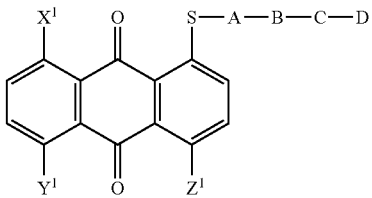

In the formula (2), S is a sulfur atom; and $X^1$, $Y^1$ and $Z^1$ each independently represents a hydrogen atom, halogen atom, hydroxyl, optionally substituted amino, arylthio or heteroarylthio, provided $X^1$, $Y^1$ and $Z^1$ are not all hydrogen. Preferred examples of amino groups represented by $X^1$, $Y^1$ and $Z^1$ are non-substituted amino (—NH$_2$), arylamino groups, heteroarylamino groups, acylamino groups and alkylamino groups, more preferred examples are arylamino groups, heteroarylamino groups, acylamino groups and alkylamino groups.

Aryl groups included in the arylamino groups represented by $X^1$, $Y^1$ and $Z^1$ have preferably $C_{6-30}$, more preferably $C_{6-15}$, further more preferably $C_{6-12}$. Preferable examples of aryl groups included in the arylamino groups are p-carboxyphenyl, p-nitrophenyl, p-chlorophenyl, 3,5-dichlorophenyl, p-cyanophenyl, m-fluorophenyl, p-toryl, p-cyclohexylphenyl. Aryl groups included in the arylamino groups may have any substituent selected from the substituent group "V".

Heteroaryl groups included in the heteroarylamino groups represented by $X^1$, $Y^1$ and $Z^1$ have preferably $C_{1-20}$, more preferably $C_{2-15}$, further more preferably $C_{4-10}$. Preferred examples of heteroaryl groups included in the hetreroarylamino groups are pyridyl, 5-methylpyridyl, thienyl and furyl. Heteroaryl groups included in the heteroarylamino groups may have any substituent selected from the substituent group "V".

Acyl groups included in the acylamino groups represented by $X^1$, $Y^1$ and $Z^1$ have preferably $C_{1-20}$, more preferably $C_{2-12}$, further more preferably $C_{2-8}$. Preferred examples of acyl groups included in the acylamino groups are acethyl, benzoyl and trichloroacethyl. Acyl groups included in the acylamino groups may have any substituent selected from the substituent group "V".

Alkyl groups included in the alkylamino groups represented by $X^1$, $Y^1$ and $Z^1$ have preferably $C_{1-20}$, more preferably $C_{2-15}$, further more preferably $C_{2-10}$. Preferred examples of alkyl groups included in the alkylamino groups are methyl, ethyl, propyl, butyl, pentyl, hexyl, phenethyl, methoxyethyl, fluoroethyl and chloroethyl. Alkyl groups included in the alkylamino groups may have any substituent selected from the substituent group "V".

Aryl groups included in arylthio groups represented by $X^1$, $Y^1$ and $Z^1$ have preferably $C_{6-30}$, more preferably $C_{6-25}$, further preferably $C_{6-20}$. Preferred examples of aryl groups included in the arylthio groups are phenyl, naphthyl, p-carboxyphenyl, p-nitrophenyl, p-chlorophenyl, 3,5-dichlorophenyl, p-cyanophenyl, m-fluorophenyl, p-tryl, p-cyclohexylphenyl, p-(4-buthylcyclohexyl)phenyl, p-(p-hexylphenyl)phenyl and p-(p-(4-penthylcyclohexyl)phenyl) phenyl. Aryl groups included in the arylthio groups may have any substituent thio, selected from the substituent group "V".

Heteroaryl groups included in the heteroarylthio groups represented by $X^1$, $Y^1$ and $Z^1$ have preferably $C_{1-20}$, more preferably $C_{2-15}$, further more preferably $C_{4-10}$. Preferable examples of heteroaryl groups included in the hetreroarylthio groups are pyridyl, 5-methylpyridyl, thienyl and furyl. Heteroaryl groups included in the heteroarylthio groups may have any substituent selected from the substituent group "V".

It is preferable that $X^1$, $Y^1$ and $Z^1$ each independently represents a hydrogen, chlorine, bromine, amino(—NH$_2$), optionally substituted alkylamino, optionally substituted arylamino, optionally substituted arylthio or optionally substituted heteroarylthio; more preferable that $X^1$, $Y^1$ and $Z^1$ each independently represents a hydrogen, optionally substituted alkylamino, optionally substituted arylthio or optionally substituted heteroarylthio. However, $X^1$, $Y^1$ and $Z^1$ are not all hydrogen.

In the formula (2), A, B and C each independently represents an optionally substituted arylene, heteroarylene or cyclohexandiyl.

The arylene groups have preferably $C_{6-20}$. Arylene groups may have any substituent selected from the substituent group "V". Preferred examples of the arylene groups are optionally substituted, phenylene, naphthylene and anthrathenylene.

The heteroarylene groups have preferably $C_{2-20}$. Heteroarylene groups may have any substituent selected from the substituent group "V". Preferred examples of the heteroarylene groups are optionally substituted, pyridin-diyl, quinolin-diyl, isoquinolin-diyl, pyrimidylene, pyrazin-diyl, thiophenylene, furanylene, oxazolylene, thiazolylene, imidazolylene, pyrazolylene, oxadiazolylene, thiadiazolylene, triazolylenephenylene and any bivalent groups of fused aromatic rings formed by condensation thereof.

The cyclohexandiyl groups have any substituent selected from the substituent group "V". One preferred example of the cyclohexandiyl groups is (E)-cyclohexan-1,4-diyl.

It is preferable that A is an optionally substituted phenylene, more preferably 1,4-phenylene; and that Either of B and C is a cyclohexandiyl, more preferably B is an optionally substituted arylene and C is a cyclohexandiyl, especially preferably B is a 1,4-phenylene and C is a (E)-cyclohexandiyl-1,4-diyl.

In the formula (2), D represents an optionally substituted alkyl, cycloalkyl, alkoxy, alkoxycarbonyl or acyloxy. They may have any substituent selected from the substituent group "V". Preferred examples of D are alkyl and cycloalkyl groups having $C_{1-30}$, preferably $C_{1-12}$, more preferably $C_{1-8}$ (e.g., methyl, ethyl, propyl, butyl, t-butyl, i-butyl, s-butyl, pentyl, t-pentyl, hexyl, heptyl, octyl, cyclohexyl, 4-methylcyclohexyl, 4-ethylcyclohexyl, 4-propylcyclohexyl, 4-butylcyclohexyl, 4-pentylcyclohexyl, hydroxymethyl, trifluoromethyl, benzyl); alkoxy groups having $C_{1-20}$, preferably $C_{1-10}$, more preferably $C_{1-8}$ (e.g., methoxy, ethoxy, 2-methoxyethoxy, 2-phenylethoxy); acyloxy groups having $C_{1-20}$, preferably $C_{2-12}$, more preferably $C_{2-8}$ (e.g., acethyloxy, benzoyloxy); alkoxycarbonyl groups having $C_{2-20}$, preferably $C_{2-12}$, more preferably $C_{2-8}$ (e.g., methoxycarbonyl, ethoxycarbonyl, 2-benzyloxycarbonyl). D is more preferably an alkyl or alkoxy group, further more preferably ethyl, propyl, buthyl, penthyl hexyl or trifluoromethoxy.

In the formula (2) $X^1$, $Y^1$, $Z^1$, A, B, C and D each may have any substituent, typical examples of it may be belong to the substituent group "V".

As another preferred embodiment of this invention, there is provided the anthraquinone compound represented by any one of formulae (3)-(6) below:

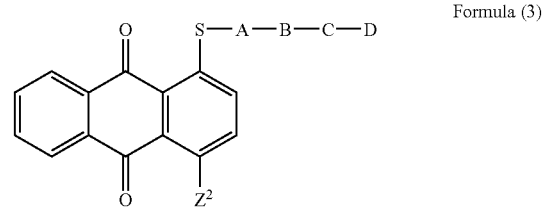

Formula (3)

-continued

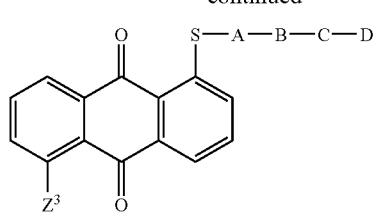

Formula (4)

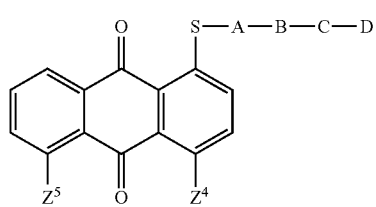

Formula (5)

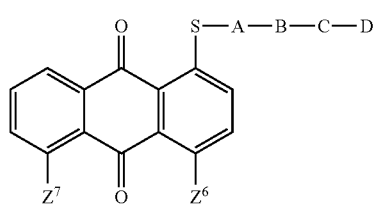

Formula (6)

In the formulae (3)-(6), $Z^2$ to $Z^8$ each independently represents an optionally substituted arylthio or heteroarylthio. In the formulae (3)-(6), S, A, C and D each represents the same as in the formula (2), and also the preferred examples thereof may be the same.

Aryl groups included in the arylthio groups represented by $Z^2$ to $Z^8$ have preferably $C_{6-30}$, more preferably $C_{6-25}$, further more preferably $C_{6-20}$. Preferred examples of aryl groups included in the arylthio groups are phenyl, naphthyl, p-carboxyphenyl, p-nitrophenyl, p-chlorophenyl, 3,5-dichlorophenyl, p-cyanophenyl, m-fluorophenyl, p-tryl, p-cyclohexyl-phenyl, p-(4-buthylcyclohexyl)phenyl, p-(p-hexylphenyl)phenyl and p-(p-(4-penthylcyclohexyl)phenyl) phenyl.

Heteroaryl groups included in the heteroarylthio groups represented by $Z^2$ to $Z^8$ have preferably $C_{1-20}$, more preferably $C_{2-15}$, further more preferably $C_{4-10}$. Preferred examples of heteroaryl groups included in the hetreroarylamino groups are pyridyl, 5-methylpyridyl, thienyl and furyl.

Aryl and heteroaryl groups included in the arylthio and heteroarylthio each may have any substituent selected from the substituent group "V".

Absorption peaks of compounds represented by formulae (3) to (6) will be explained bellow.

Generally, compounds represented by each the formula (3) and (4) exhibit at least one absorption maximum at the range of 430 nm-480 nm; compounds represented by the formula (5) exhibit at least one absorption maximum at the range of 480 nm-540 nm; and compounds represented by the formula (6) exhibit at least one absorption maximum at the range of 500 nm-580 nm. Namely, it is shown a rough tendency that compounds represented by each the formula (3) (or (4)), (5) and (6) are shifted long-wavelength in the sequence.

As another preferred embodiment of this invention, there is provided the anthraquinone compound represented by formula (1-a) below:

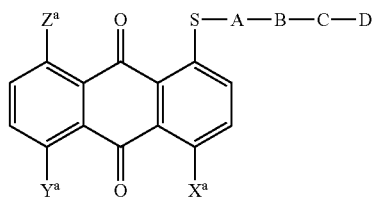

Formula (1-a)

In the formula (1-a), s, A, B and C each represents the same as in the formula (2), and also the preferred examples thereof may be the same.

In the formula (1-a), $X^a$, $Y^a$ and $Z^a$ each represents a hydrogen, optionally substituted arylthio or heteroarylthio group, provided at least one of $X^a$, $Y^a$ and $Z^a$ represents an arylthio group. Arylthio and heteroarylthio groups represented by $X^a$, $Y^a$ and $Z^a$ maybe the same as those represented by $Z^2$ to $Z^8$ in the formula (3) to (6), and also the specific and preferred examples thereof may be the same.

As preferred embodiments of the anthraquinone compound represented by the formula (1-a), there are provided an anthraquinone compound represented by following formula (2-a) that is equal to the formula (1-a) wherein $X^a$ and $Z^a$ are hydrogen and $Y^a$ is an optionally arylthio group; and an anthraquinone compound represented by following formula (3-a) that is equal to the formula (1-a) wherein $X^a$, $Y^a$ and $Z^a$ are all optionally substituted arylthio groups.

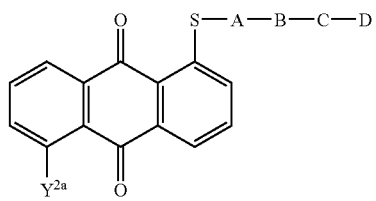

Formula (2-a)

In the formula (2-a), S, A, B, C, and D are each represents the same as in the formula (1-a), and also the preferred examples thereof may be the same. $Y^{2a}$ represents an optionally substituted arylthio group. The arylthio group represented by $Y^{2a}$ may be the same as those represented by $X^a$, $Y^a$ and $Z^a$ in the formula (1-a), and also the specific and preferred examples thereof may be the same.

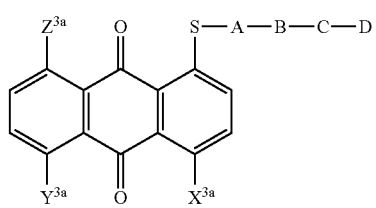

Formula (3-a)

In the formula (3-a), S, A, B, C, and D are each represents the same as in the formula (1-a), and also the preferred examples thereof maybe the same. $Y^{2a}$ represents an optionally substituted arylthio group. The arylthio group represented by $Y^{2a}$ may be the same as those represented by $X^a$, $Y^a$ and $Z^a$ in the formula (1-a), and also the specific and preferred examples thereof may be the same.

Particular preferable examples of anthraquinone compounds represented by the formula (1-a) is an anthraquinone compound wherein $X^a$ and $Z^a$ are both hydrogen and $Y^a$ is an optionally substituted phenylthio group (more preferably 4-substituted phenylthio group); and an anthraquinone compound wherein $X^a$, $Y^a$ and $Z^a$ each independently represents an optionally substituted phenylthio group (more preferably 4-substituted phenylthio group). Namely, former is an anthraquinone compound represented by the formula (2-a) wherein $Y^{2a}$ is an optionally substituted arylthio group (more preferably 4-substituted phenylthio group), and latter is an anthraquinone compound represented by the formula (3-a) wherein $X^{3a}$, $Y^{3a}$ and $Z^{3a}$ each independently represents an optionally substituted phenylthio group (more preferably 4-substituted phenylthio group).

Specific preferred examples of the anthraquinone compound represented by the formula (1) are given below; however, the present invention is in no way limited to these specific examples.

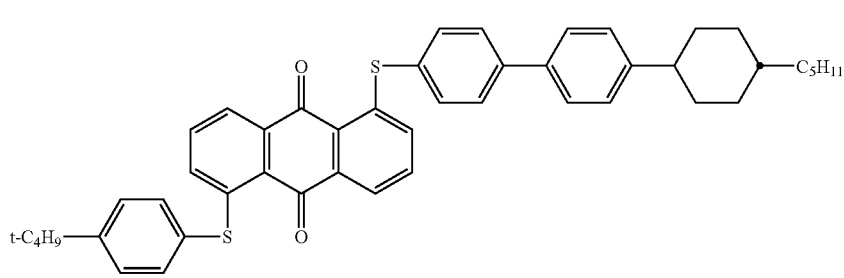

Compound (1)

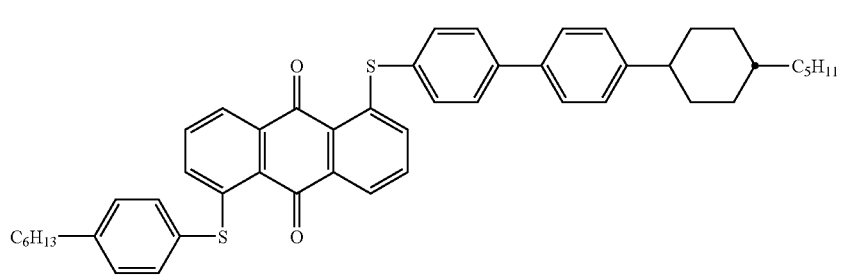

Compound (2)

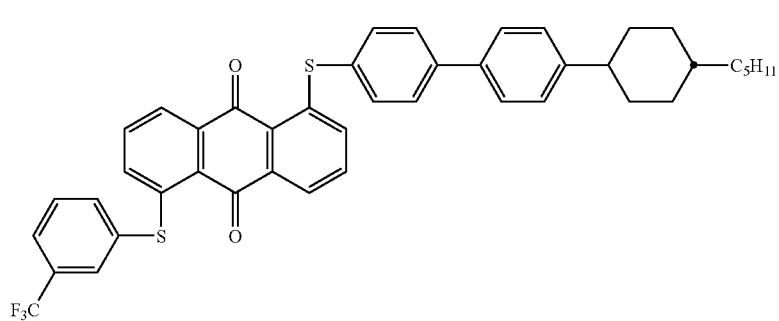

Compound (3)

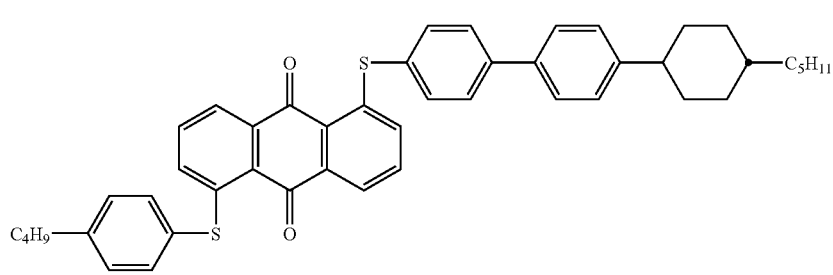

Compound (4)

-continued
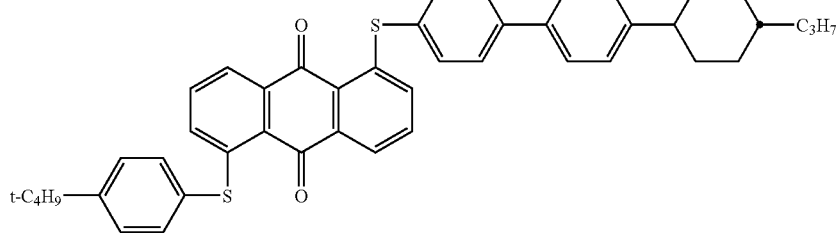
Compound (5)
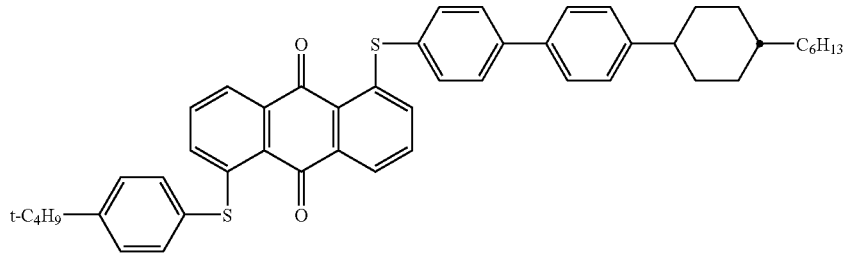
Compound (6)
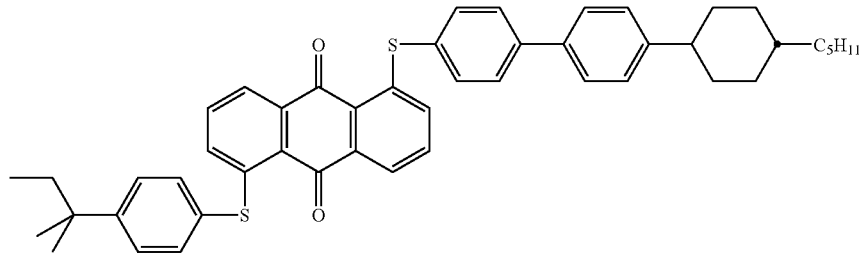
Compound (7)
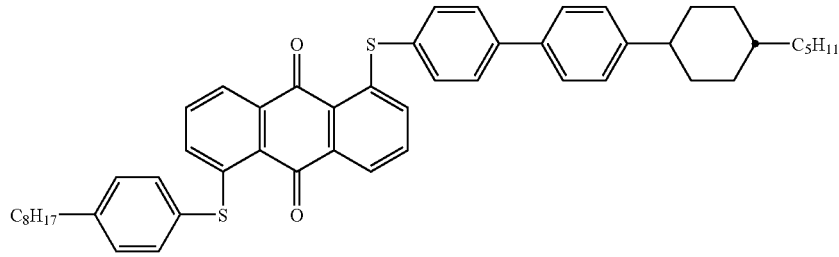
Compound (8)
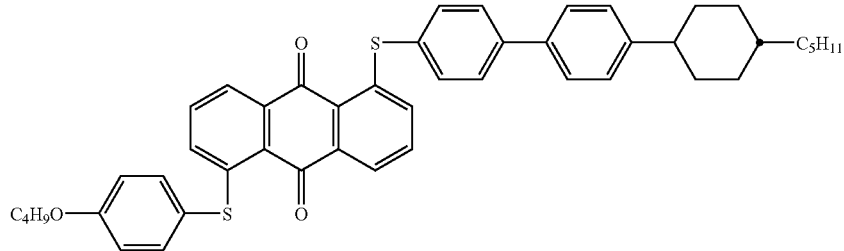
Compound (9)
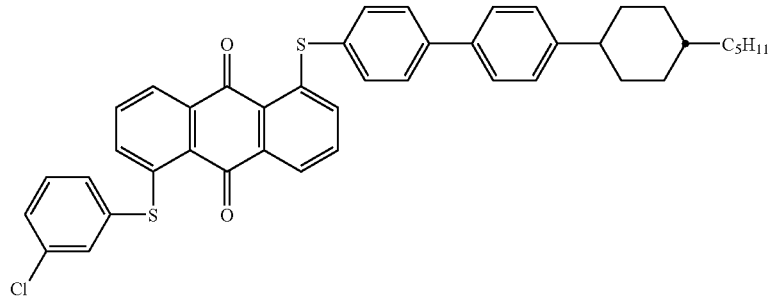
Compound (10)

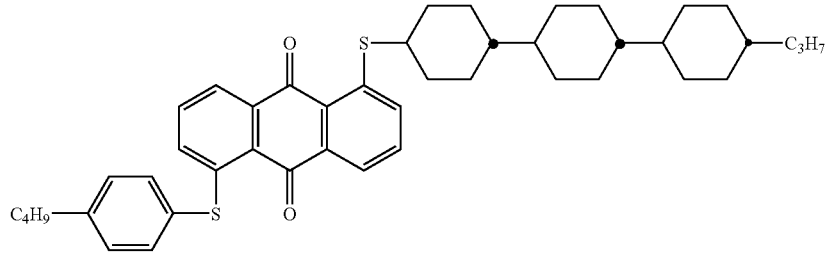
Compound (11)
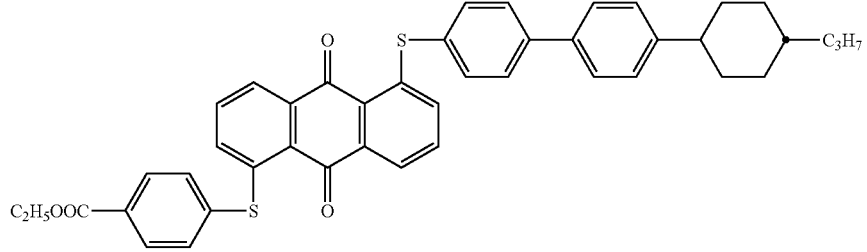
Compound (12)
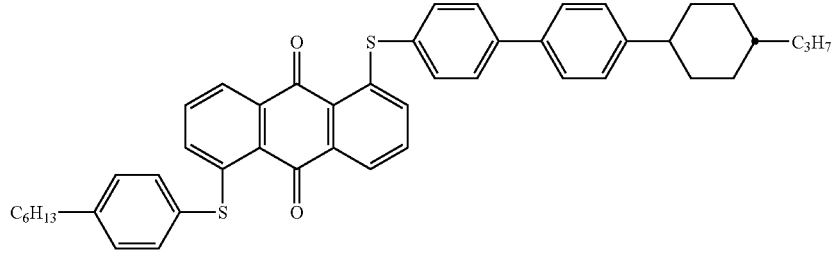
Compound (13)
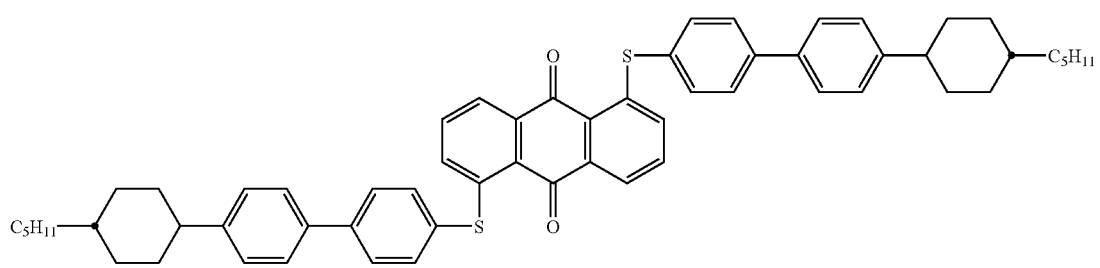
Compound (14)
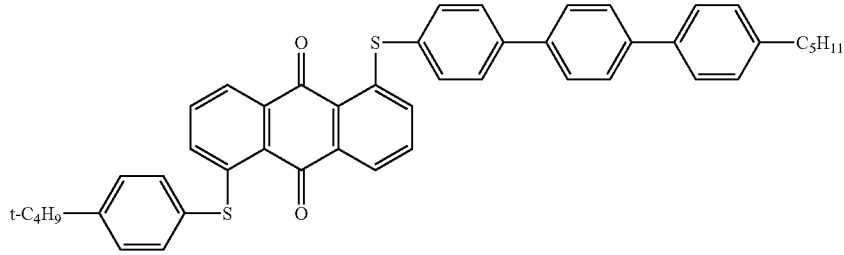
Compound (15)
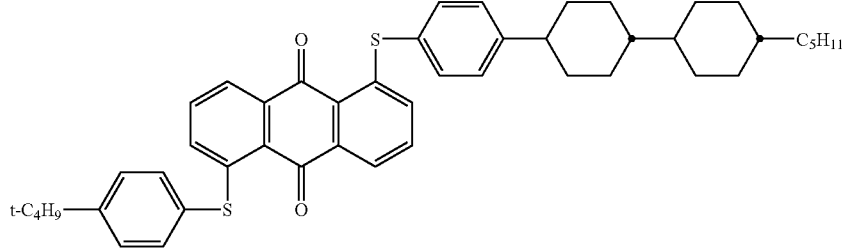
Compound (16)

-continued
Compound (17)
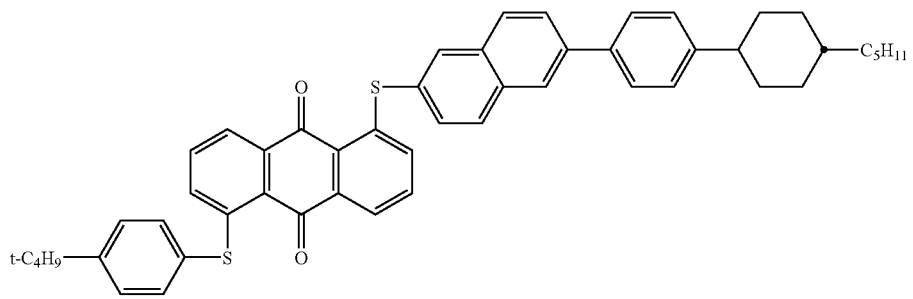
Compound (18)
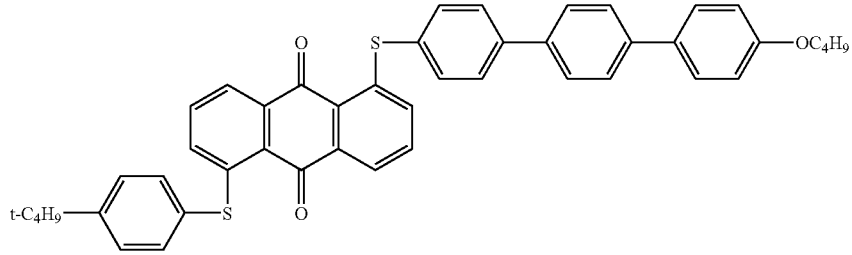
Compound (19)
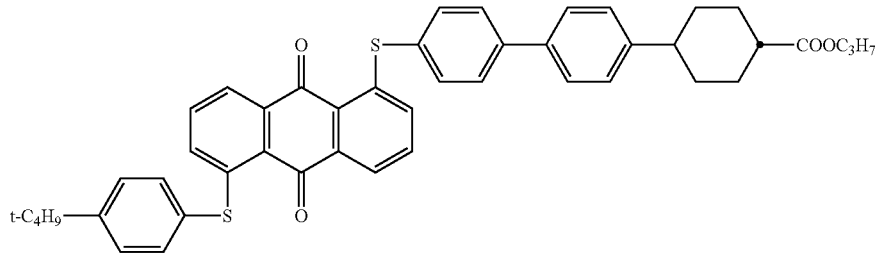
Compound (20)
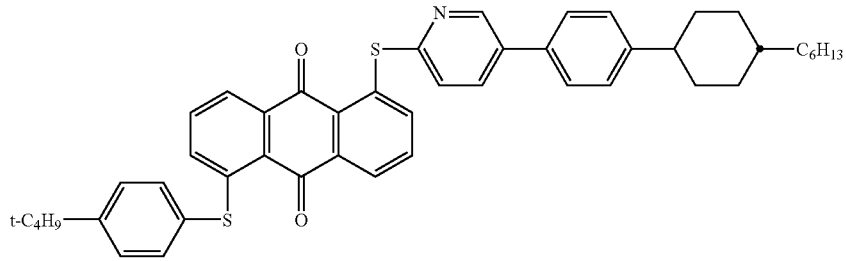
Compound (21)
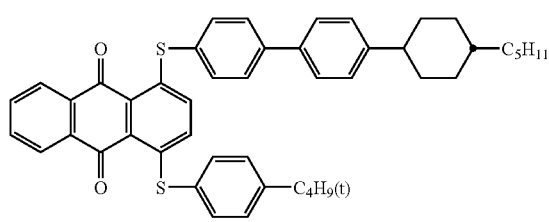
Compound (22)
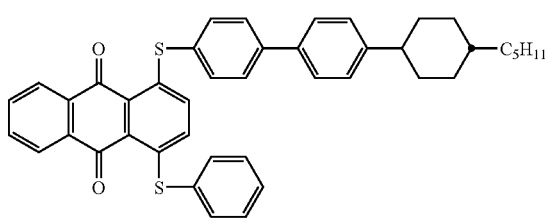
Compound (23)
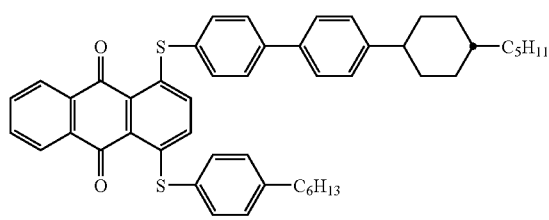
Compound (24)
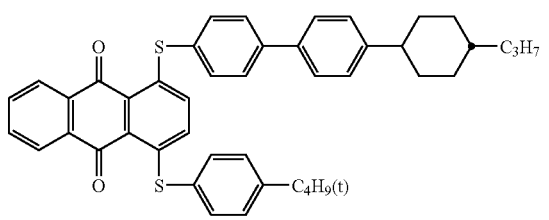

-continued
Compound (25)
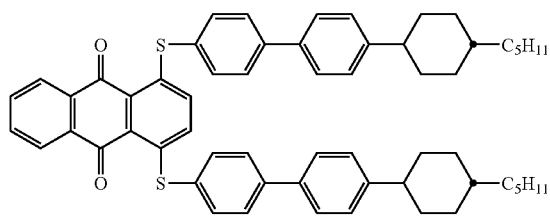
Compound (26)
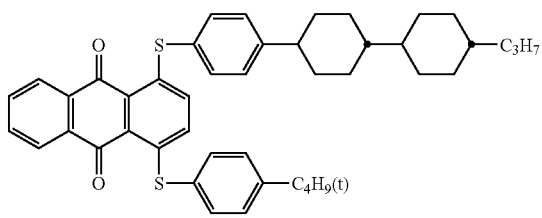
Compound (27)
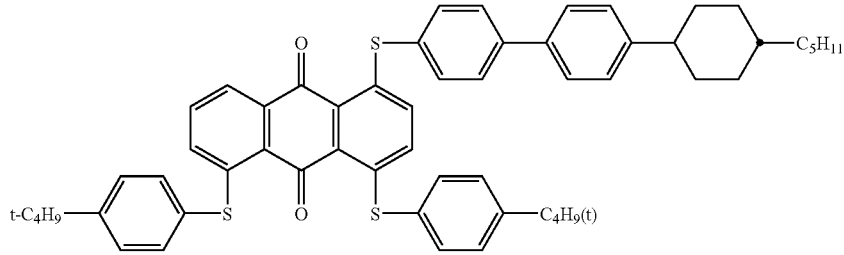
Compound (28)
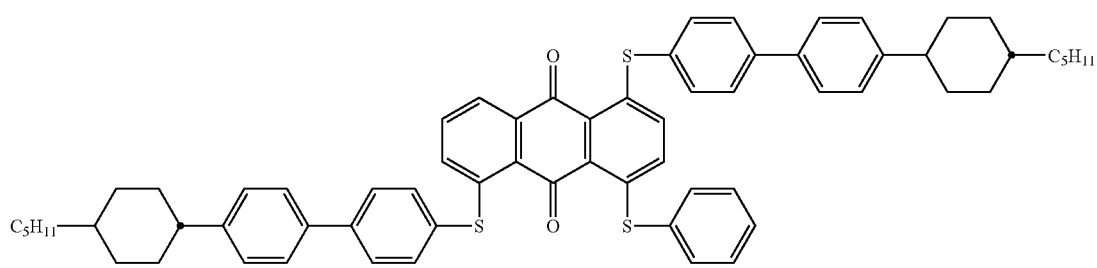
Compound (29)
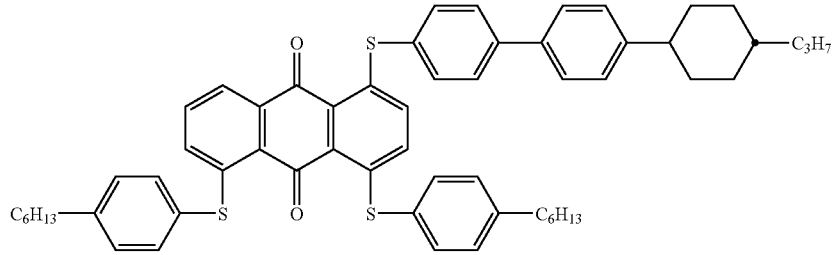
Compound (30)
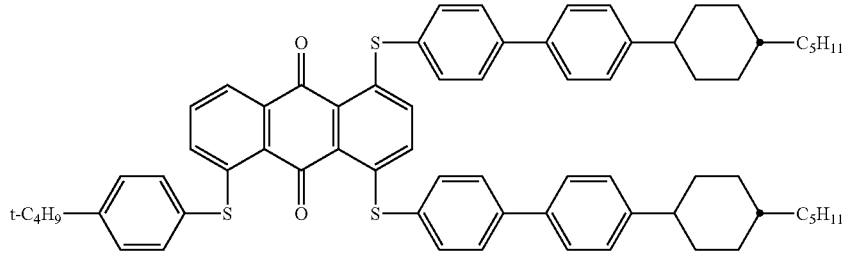
Compound (31)
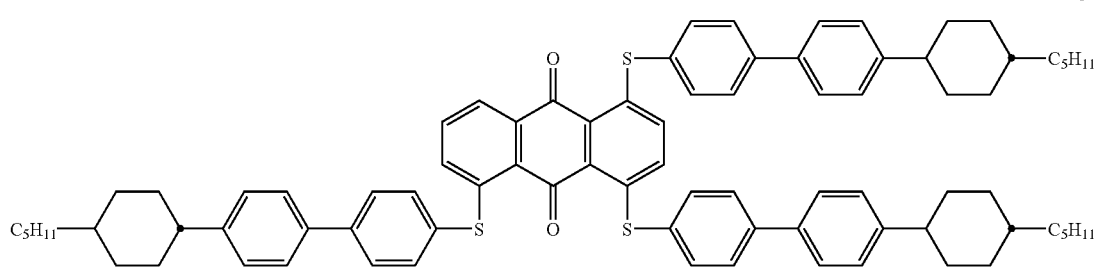

-continued
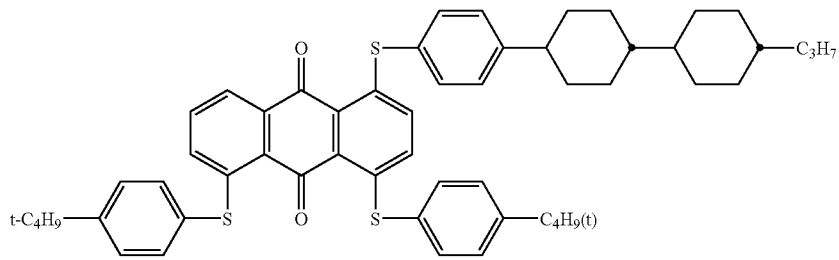
Compound (32)
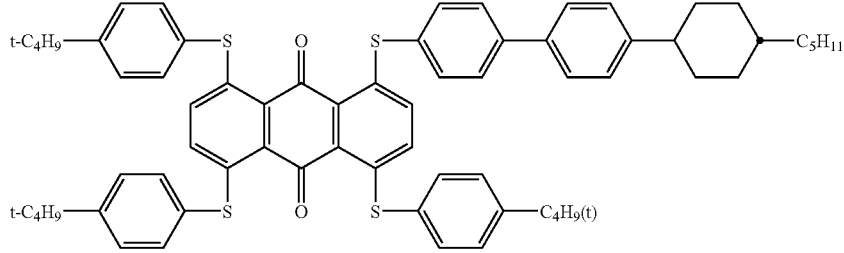
Compound (33)
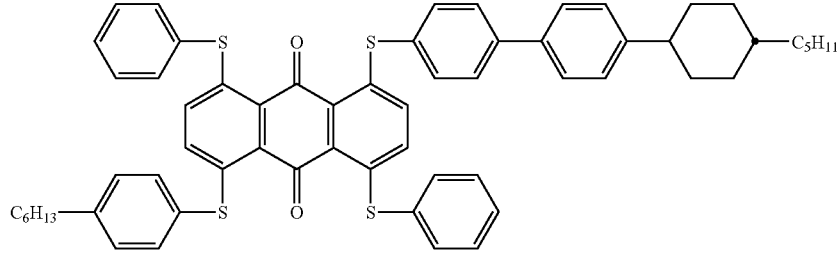
Compound (34)
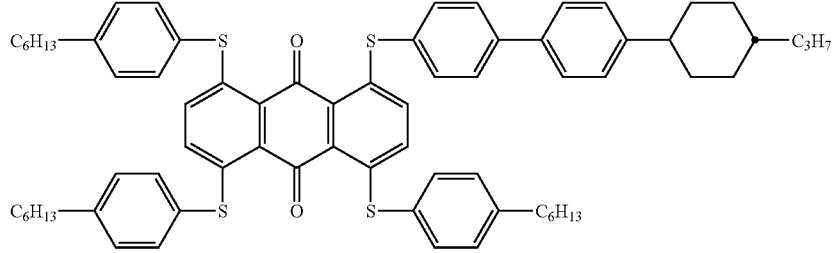
Compound (35)
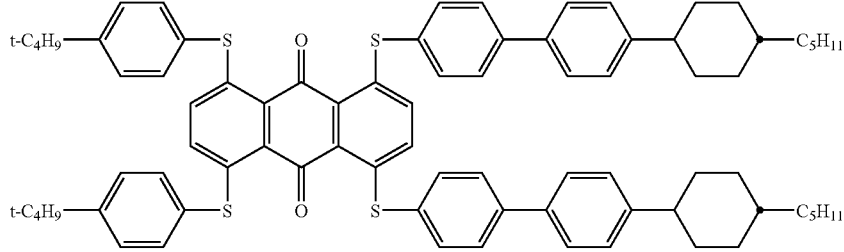
Compound (36)
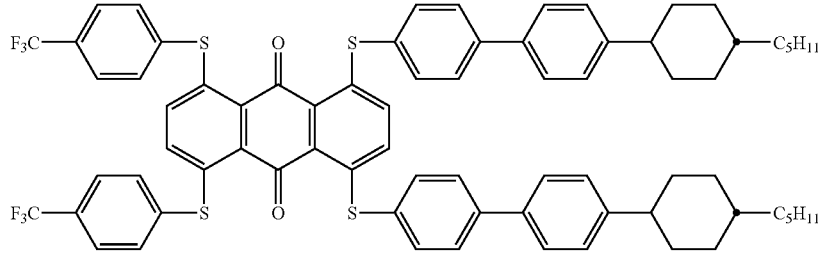
Compound (37)

-continued
Compound (38)
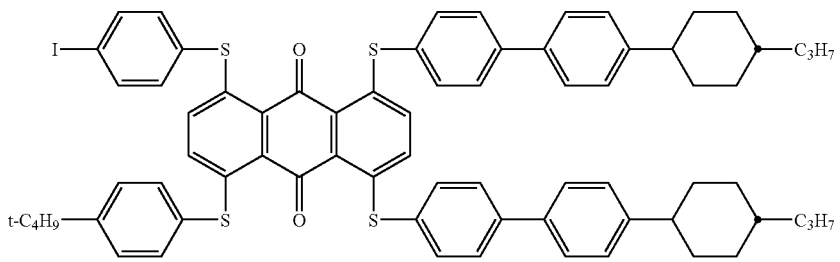
Compound (39)
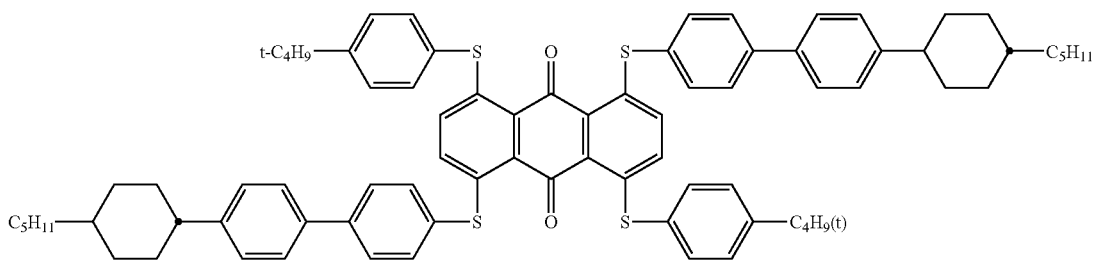
Compound (40)
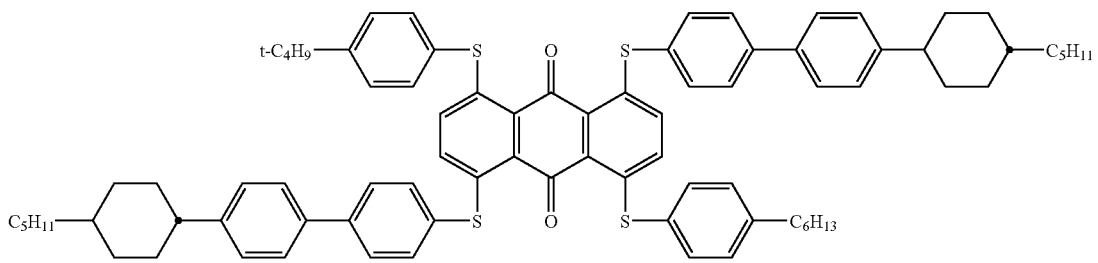
Compound (41)
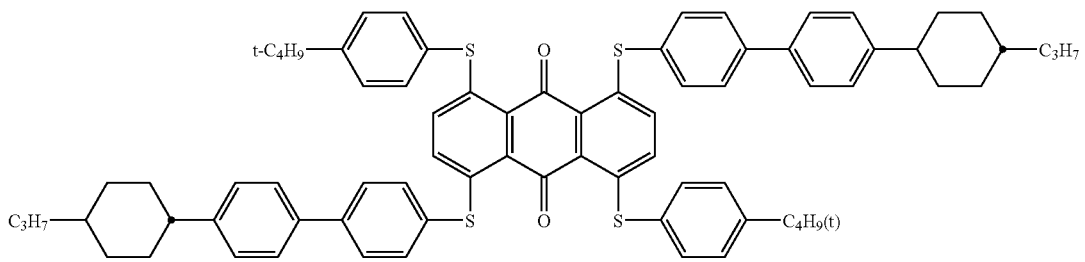
Compound (42)
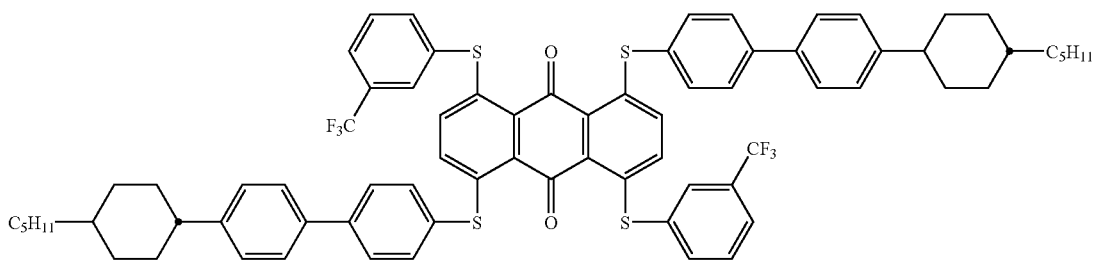

-continued
Compound (43)
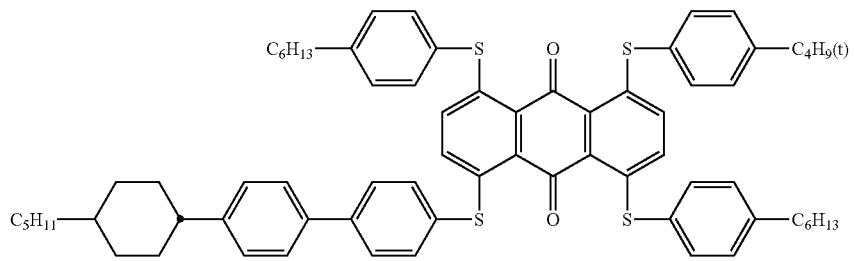
Compound (44)
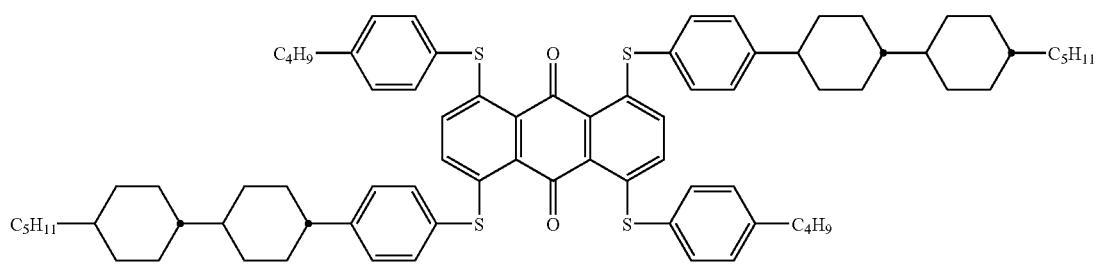
Compound (45)
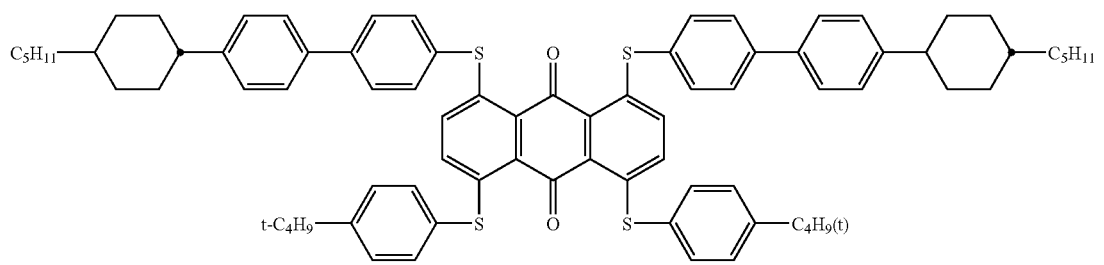
Compound (46)
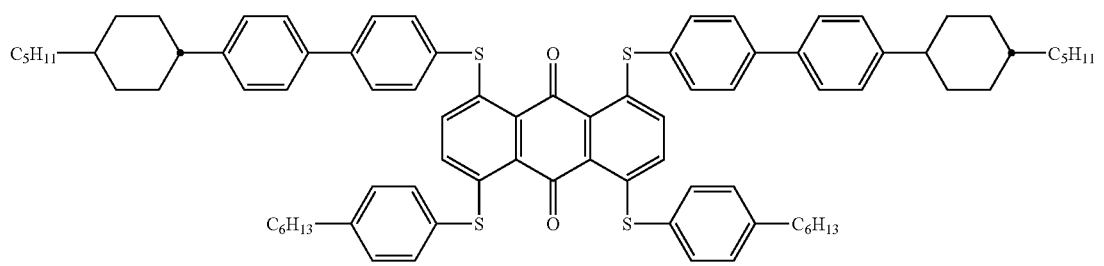
Compound (47)
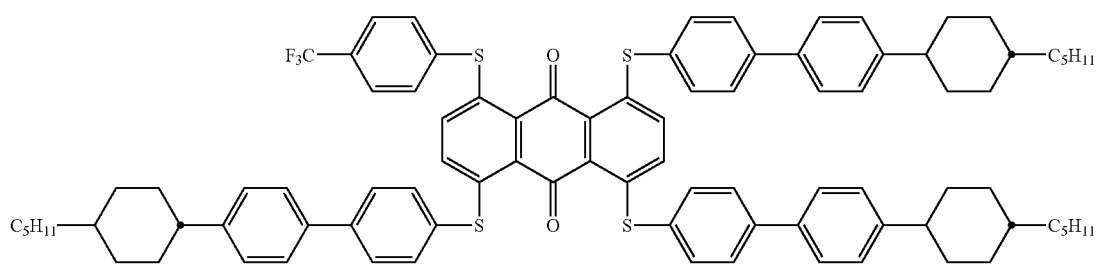

-continued
Compound (48)
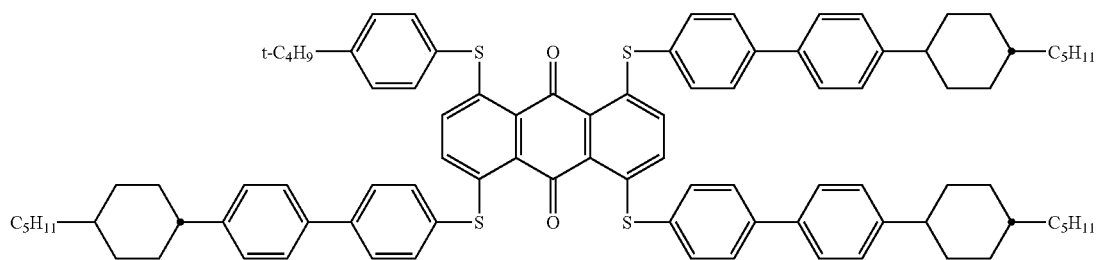
Compound (49)
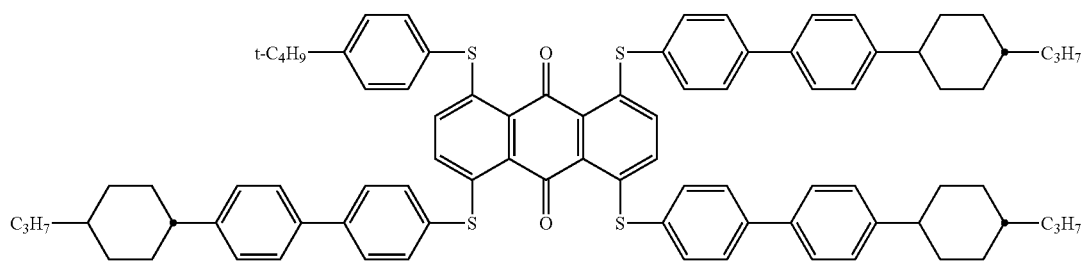
Compound (50)
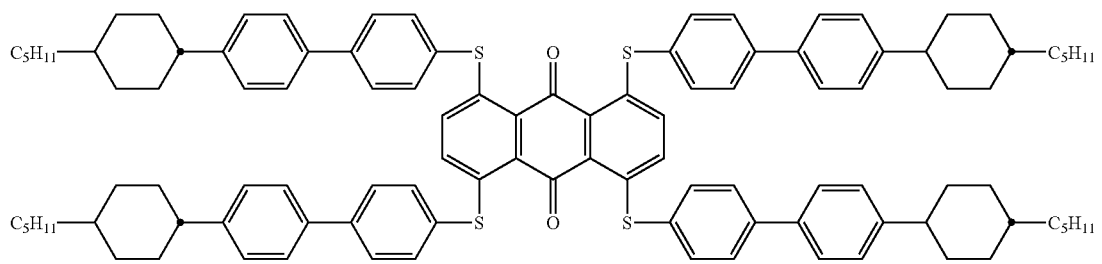
Compound (51)
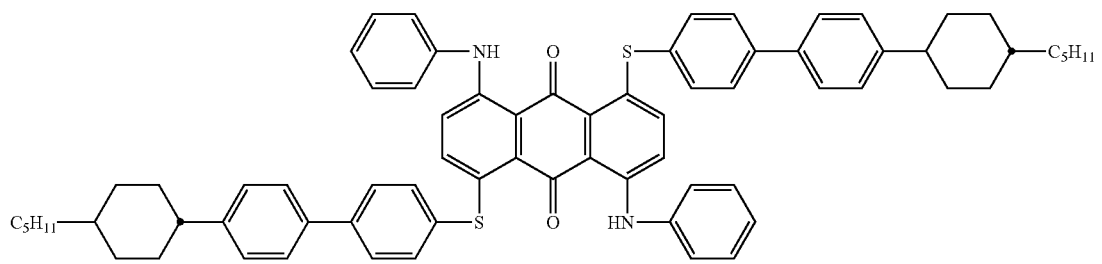
Compound (52)
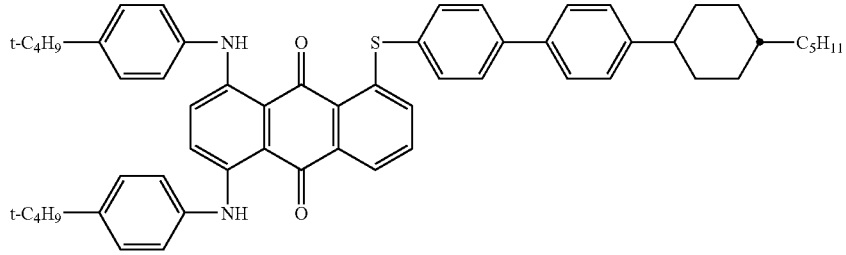

-continued
Compound (53)
Compound (54)
Compound (55)
Compound (56)
Compound (57)
Compound (58)

-continued
Compound (59)
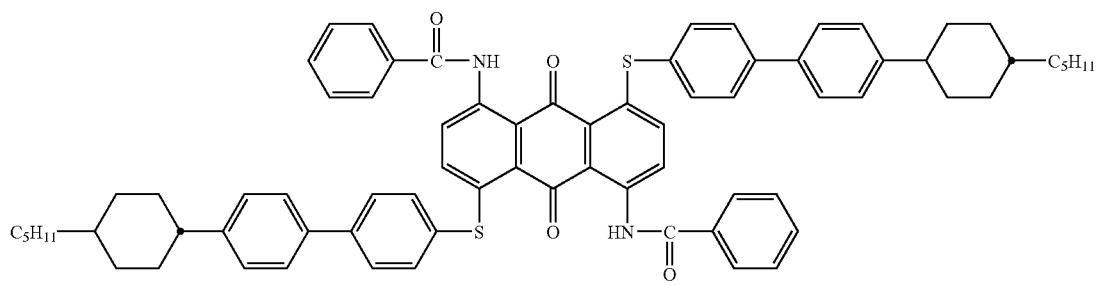
Compound (60)
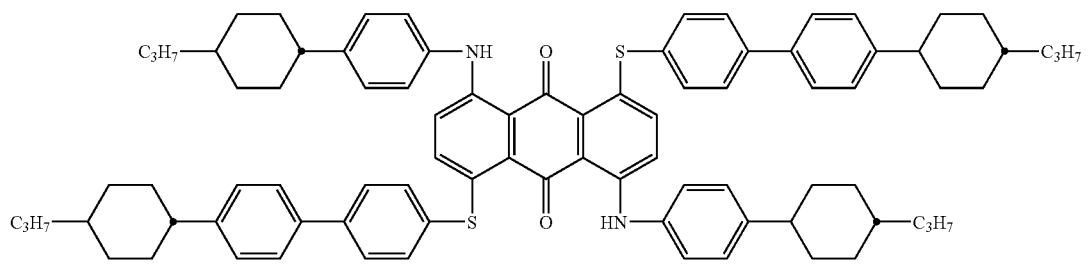
Compound (61)
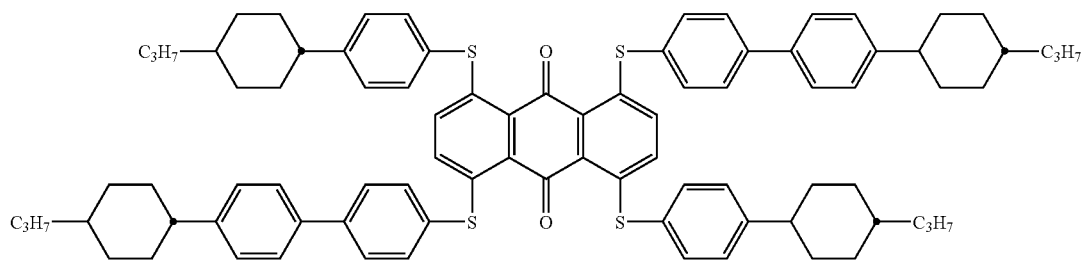
Compound (62)
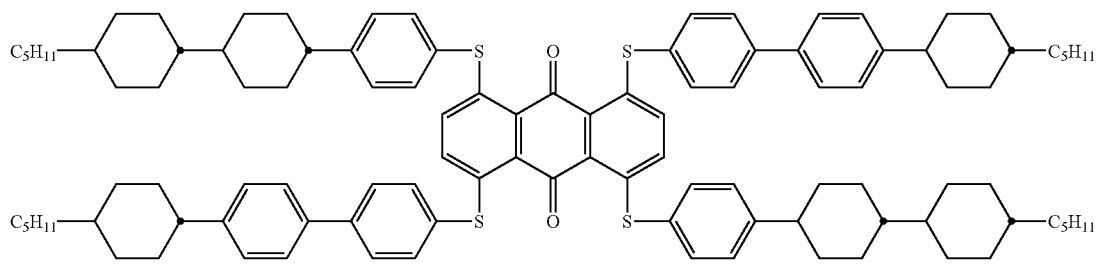
Compound (63)
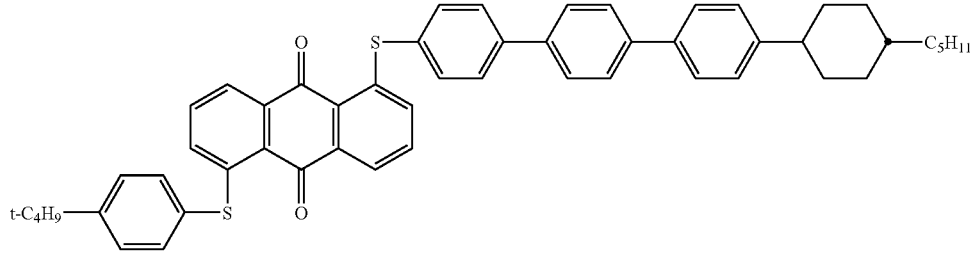

-continued
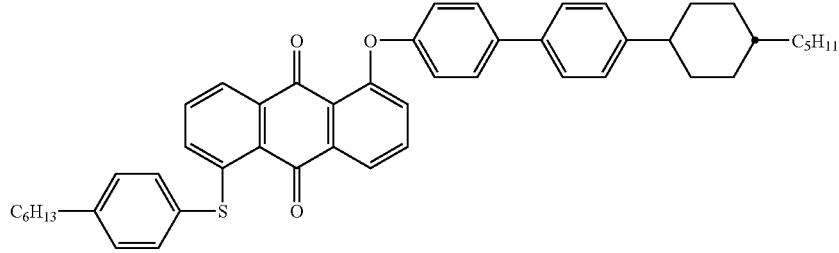
Compound (64)
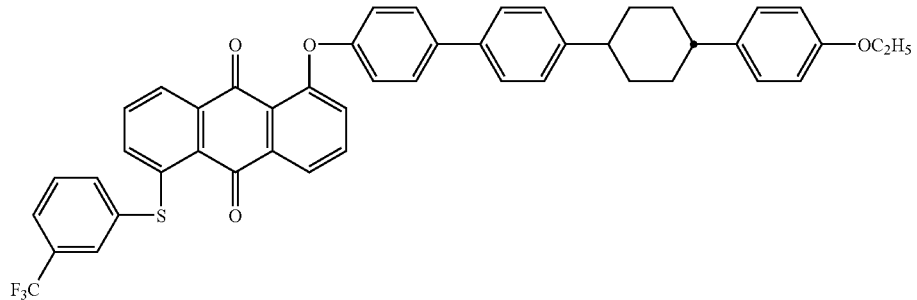
Compound (65)
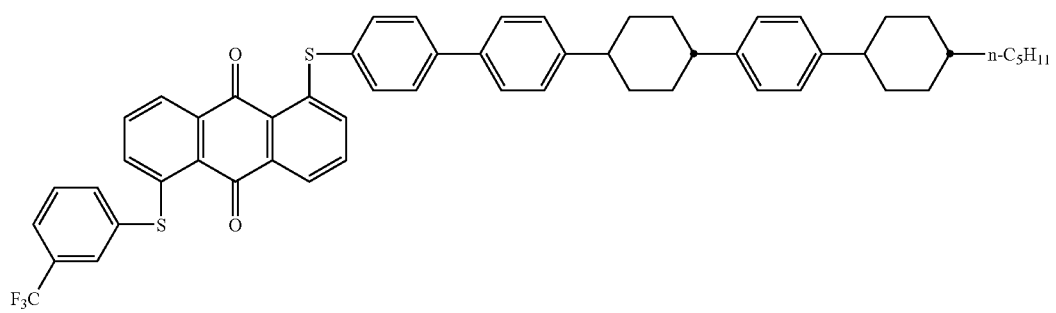
Compound (66)
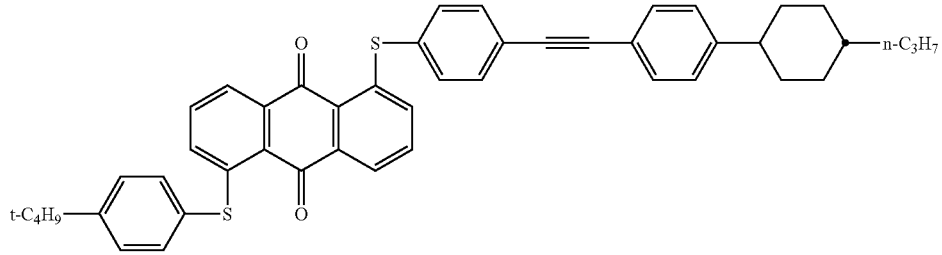
Compound (67)
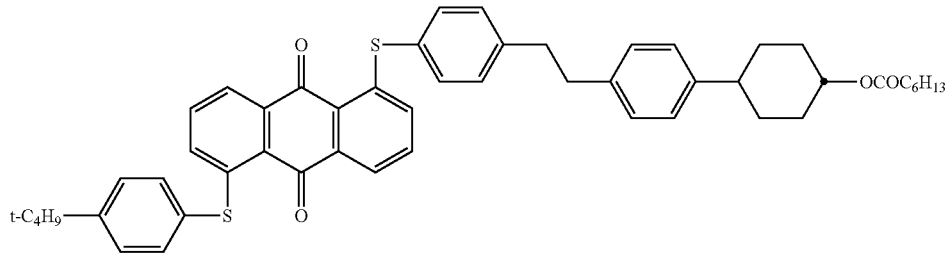
Compound (68)

Compound (69)
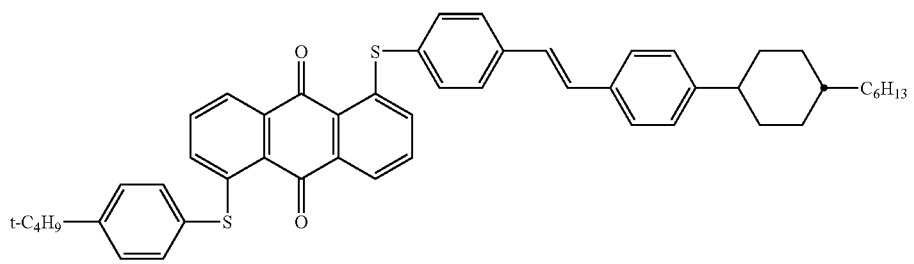
Compound (70)
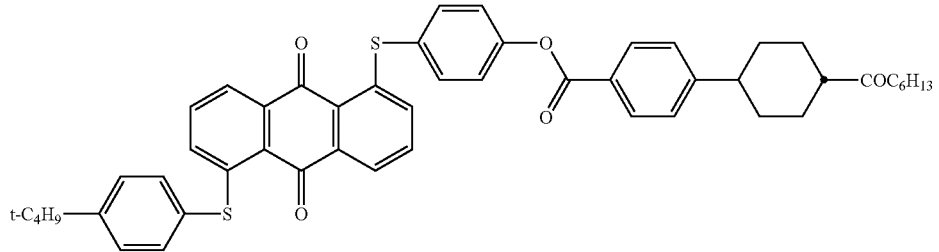
Compound (71)
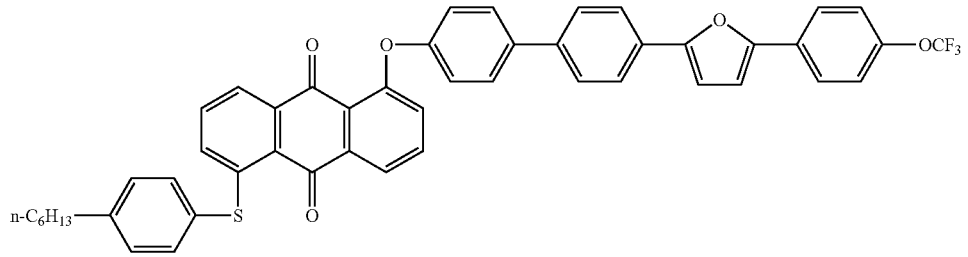
Compound (72)
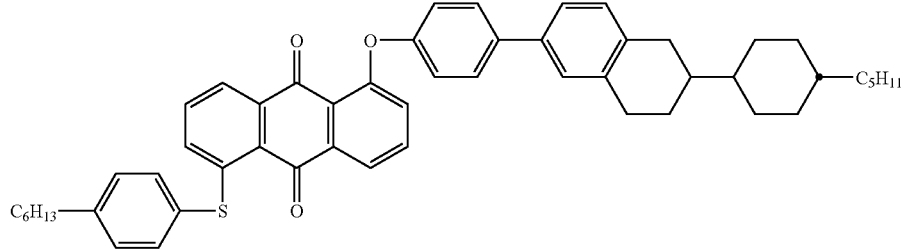
Compound (73)
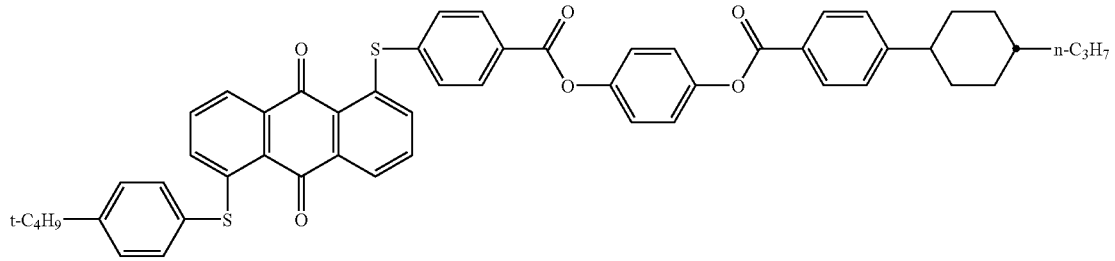
Compound (74)
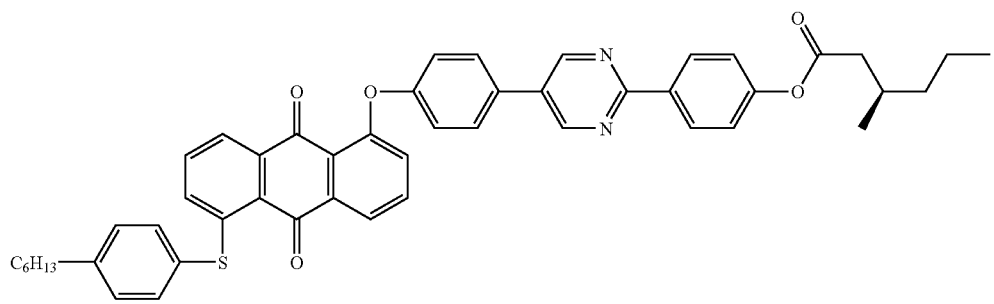

-continued
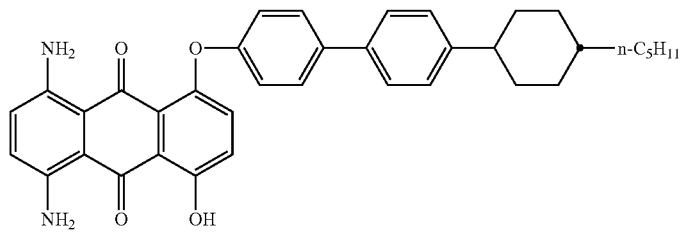
Compound (75)
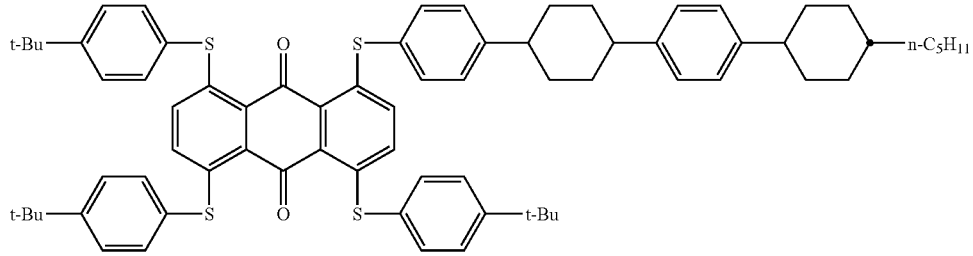
Compound (76)
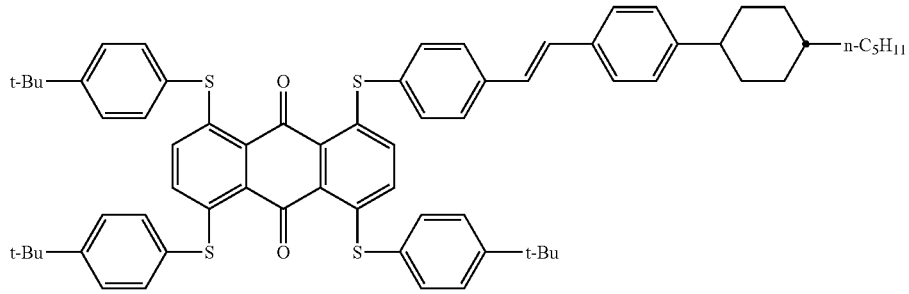
Compound (77)
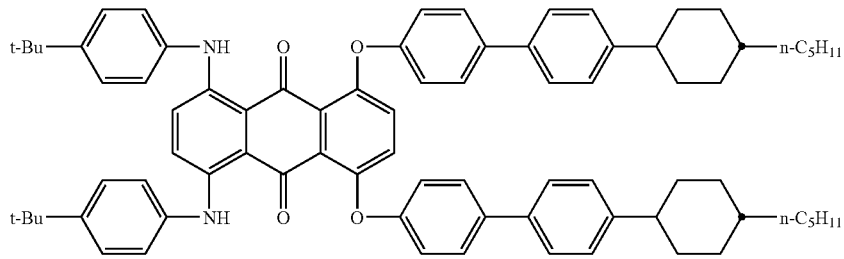
Compound (78)
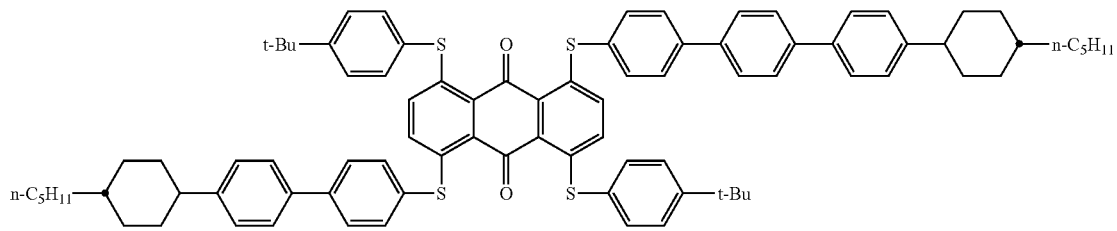
Compound (79)
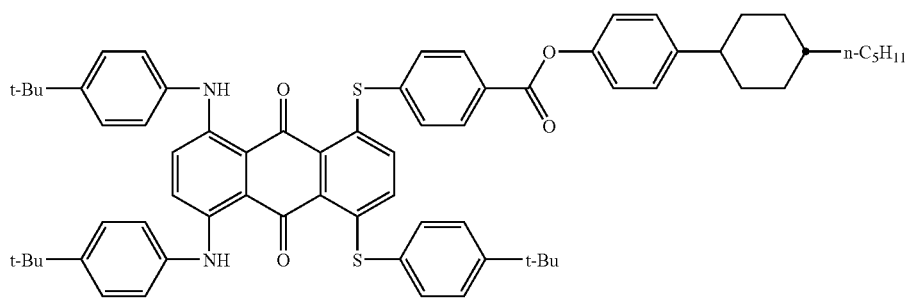
Compound (80)

-continued
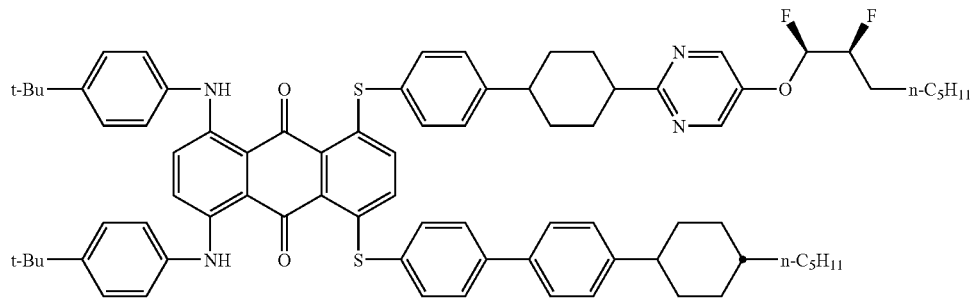
Compound (81)
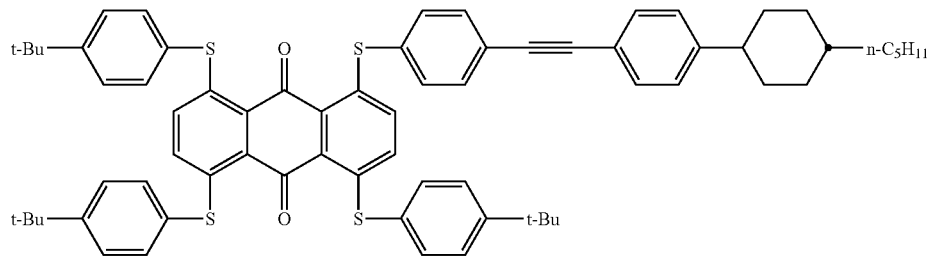
Compound (82)
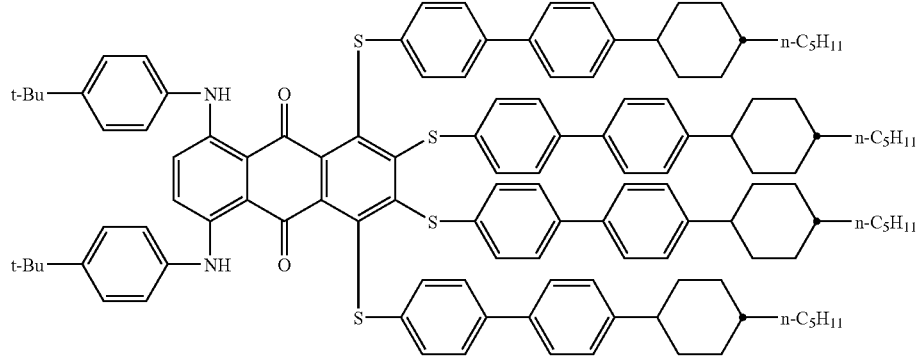
Compound (83)
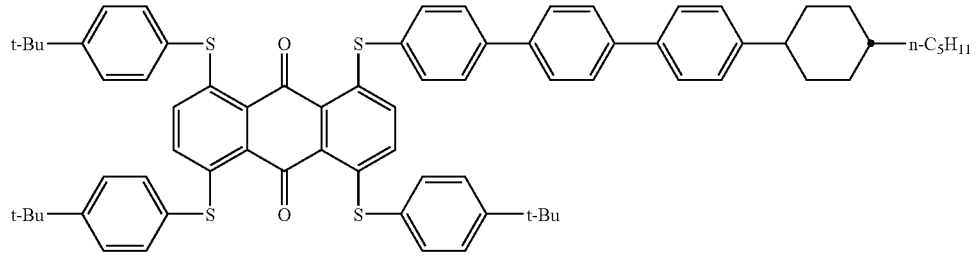
Compound (84)
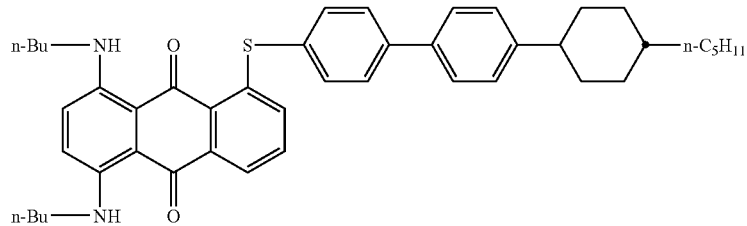
Compound (85)

-continued
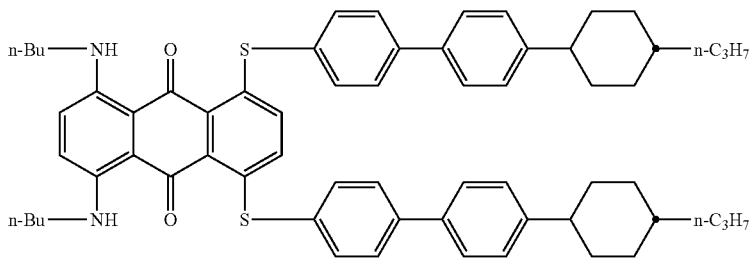
Compound (86)
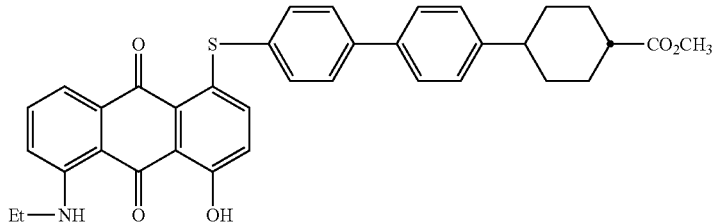
Compound (87)
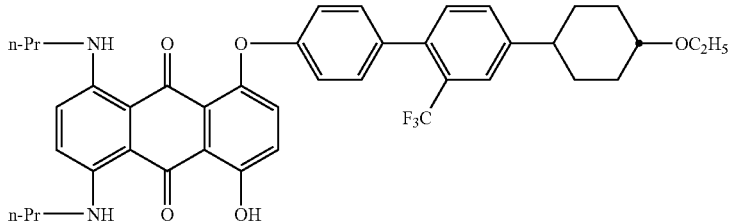
Compound (88)
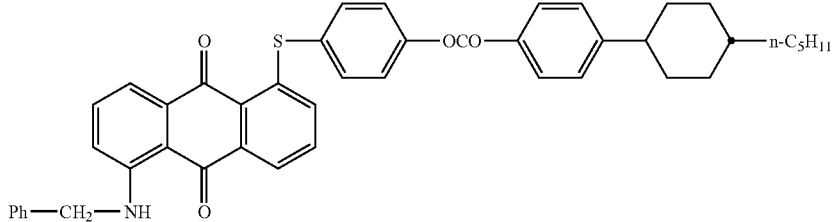
Compound (89)
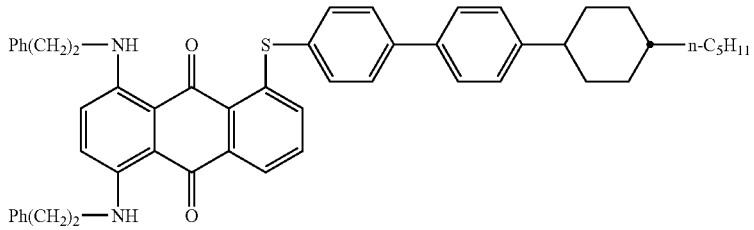
Compound (90)
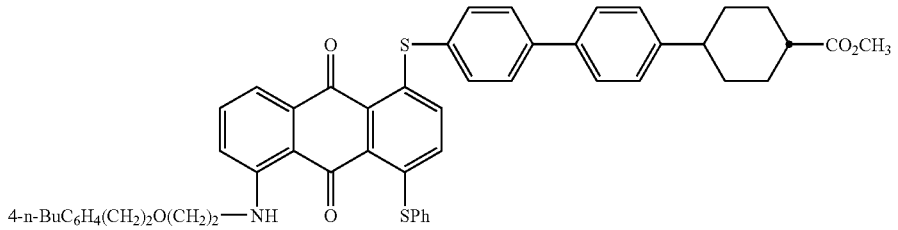
Compound (91)

-continued

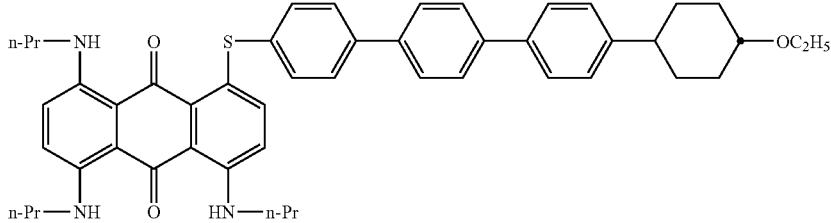

Compound (92)

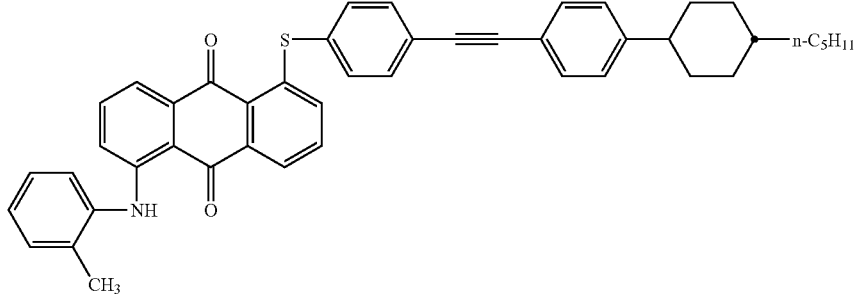

Compound (93)

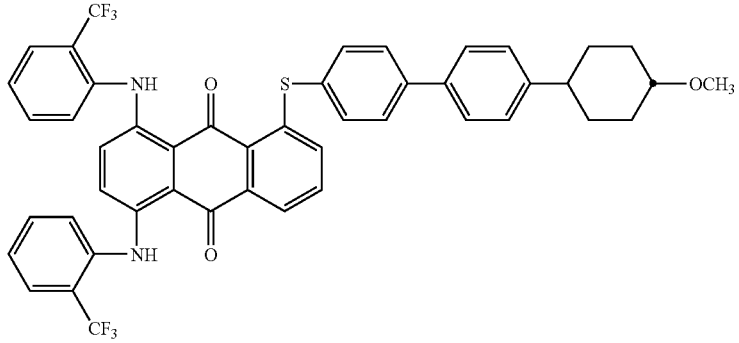

Compound (94)

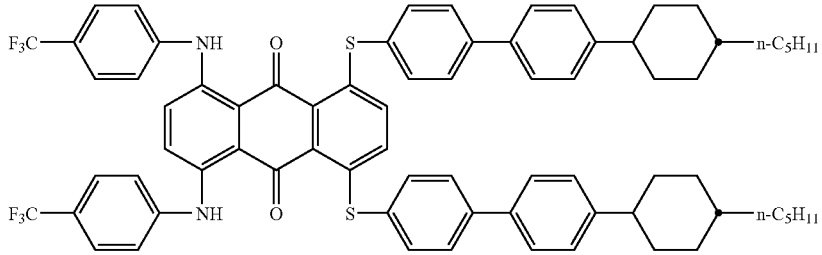

Compound (95)

The anthraquinone compounds represented by the formula (1) can be synthesized based on methods disclosed in "Dichroic Dyes for Liquid Crystal Display" (written by a. V. Ivashchenko, published by CRC, in 1994), "Sohsetsu Gohsei Senryou (Review of Synthesized Dyes)" (written by Hiroshi Horiguchi, published by Sankyo Syuppan, in 1968) and literatures cited therein.

The liquid crystal composition of the present invention is characterized in that containing an anthraquinone compound represented by the formula (1), which may occasionally be referred to as "anthraquinone compounds of the present invention". The anthraquinone compound of the present invention has a large solubility in host liquid crystals, which can thus contribute improvement of order parameter of the liquid crystal composition. In particular, the anthraquinone compound of the present invention is characterized by a high solubility in fluorine-substituted host liquid crystal, which may be suitable for TFT driving. Furthermore, using such compound as a dichroic dye for a guest-host mode liquid crystal display will successfully improve contrast.

For the liquid crystal composition of the present invention, the anthraquinone compound may be used individually, or in any combinations of two or more species. For the case of using two or more species, two or more compounds of the present invention may be mixed, or the compound of the present invention may be mixed with other known dichroic dye. Description of such known dichroic dyes available for the mixed use are typically found in "Dichroic Dyes for Liquid Crystal Display", written by A. V. Ivashchenko, published by CRC, 1994. In order to apply the liquid crystal composition of the present invention to a black-and-white display, it is preferable to use two or more dichroic dyes as mixed so that they can cooperatively absorb the light over the entire visible wavelength range.

While there is no specific limitation on the host liquid crystal (liquid crystal compound) available for the composition of the present invention, typical examples thereof include those exhibiting nematic phase or smectic phase. Specific examples thereof include azomethine compounds, cyanobiphenyl compounds, cyanophenyl esters, fluorine-substituted phenyl esters, cyclohexanecarboxylic acid phenyl esters, fluorine-substituted cyclohexanecarboxylic acid phenyl esters, cyanophenylcyclohexanes, fluorine-substituted phenylcyclohexanes, cyano-substituted phenylpyrimidines, fluorine-substituted phenylpyrimidines, alkoxy-substituted phenylpyrimidines, fluorine-substituted-alkoxy-substituted phenylpyrimidines, phenyldioxanes, tolan compounds, fluorine-substituted tolan compounds and alkenylcyclohexyl benzonitriles. Available examples of the liquid crystal compounds are found in "Ekisho Debaisu Handobukku (Liquid Crystal Device Handbook), edited by No. 142 Committee of Japan Society for the Promotion of Science, published by the Nikkan Kogyo Shimbun, Ltd., 1989, p. 154-192, and p. 715-722. The fluorine-substituted host liquid crystal such as MLC-6267, 6284, 6287, 6288, 6406, 6422, 6423, 6425, 6435, 6437, 7700, 7800, 9000, 9100, 9200, 9300, 10000, 12200, ZLI-4692 (the above are supplied by Merck), LIXON 5036XX, 5037XX, 5039XX, 5040XX, 5041XX, (the above are supplied by Chisso) etc., which is suitable for TFT driving, is preferred for this invention.

The liquid crystal composition of the present invention may be added with a compound showing no liquid crystalline property in order to adjust physical properties of the host liquid crystal (typically in order to adjust the temperature range, in which the liquid crystal phase appears, to a desirable range). It is also allowable to add other compounds such as chiral compound, UV absorber and antioxidant. Typical examples thereof relate to chiral agents for twisted-nematic (TN) and super-twisted-nematic (STN) liquid crystals, which can typically be found in "Ekisho Debaisu Handobukku (Liquid Crystal Device Handbook), edited by No. 142 Committee of Japan Society for the Promotion of Science, published by the Nikkan Kogyo Shimbun, Ltd., 1989, p. 199-202.

While there is no specific limitation on the content of the host liquid crystal and the compound of the present invention, the content of the compound of the present invention is preferably 0.1 to 15 wt % with respect to the content of the host liquid crystal, and more preferably 0.5 to 6 wt %.

The liquid crystal composition of the present invention can be prepared by dissolving the compound of the present invention into the host liquid crystal. The dissolution can be attained with the aid of mechanical stirring, heating, ultrasonic vibration and any combinations thereof.

The guest-host-type liquid crystal cell of the present invention has a liquid crystal layer containing the liquid crystal composition of the present invention.

One embodiment of the present invention is a liquid crystal cell comprising a pair of electrode substrates and a liquid crystal layer sandwiched between such electrode substrates, which contains the liquid crystal composition of the present invention. The electrode substrate generally comprises a glass substrate or plastic substrate, and an electrode layer formed thereon. Materials available for composing the plastic substrate include acryl resin, polycarbonate resin, epoxy resin and so forth. Available examples of such substrate are typically found in "Ekisho Debaisu Handobukku (Liquid Crystal Device Handbook), edited by No. 142 Committee of Japan Society for the Promotion of Science, published by the Nikkan Kogyo Shimbun, Ltd., 1989, p. 218-231. The electrode layer formed on the substrate is preferably a transparent electrode layer. Materials available for composing such electrode layer include indium oxide, indium tin oxide (ITO), tin oxide and so forth. Available examples of the transparent electrode are typically found in "Ekisho Debaisu Handobukku (Liquid Crystal Device Handbook), edited by No. 142 Committee of Japan Society for the Promotion of Science, published by the Nikkan Kogyo Shimbun, Ltd., 1989, p. 232-239.

The surface of the substrate to be brought into contact with the liquid crystal layer preferably has formed thereon a layer subjected to treatment for controlling orientation of the liquid crystal molecules (alignment film). The treatment can be effected by coating of a quaternary ammonium salt solution, rubbing a coated polyimide film, by oblique vapor deposition of $SiO_x$, and photo irradiation based on photo-isomerization reaction. Available examples of the alignment film can typically be found in "Ekisho Debaisu Handobukku (Liquid Crystal Device Handbook), edited by No. 142 Committee of Japan Society for the Promotion of Science, published by the Nikkan Kogyo Shimbun, Ltd., 1989), p. 240-256.

The liquid crystal cell of the present invention can be fabricated by opposing a pair of substrates at a distance of 1 to 50 µm as being typically interposed with a spacer, and filling the liquid crystal composition of the present invention in the space formed between such substrates. Available examples of the spacer can typically be found in "Ekisho Debaisu Handobukku (Liquid Crystal Device Handbook), edited by No. 142 Committee of Japan Society for the Promotion of Science, published by the Nikkan Kogyo Shimbun, Ltd., 1989), p. 257-262.

The liquid crystal cell of the present invention can be driven based on simple matrix driving system or active matrix driving system using thin film transistors (TFT) or the like. Examples of the driving systems applicable to the liquid crystal cell of the present invention can typically be found in "Ekisho Debaisu Handobukku (Liquid Crystal Device Handbook), edited by No. 142 Committee of Japan Society for the Promotion of Science, published by the Nikkan Kogyo Shimbun, Ltd., 1989), p. 387-460.

The liquid crystal cell of the present invention can be applicable to liquid crystal display. While the display modes thereof are not specifically limited, representative systems described in "Ekisho Debaisu Handobukku (Liquid Crystal Device Handbook), edited by No. 142 Committee of Japan Society for the Promotion of Science, published by the Nikkan Kogyo Shimbun, Ltd., 1989, p. 309 include those based on (1) homogeneous orientation and (2) homeotropic orientation, both of which being classified in the guest-host-type; and (3) focalconic orientation and (4) homeotropic orientation, both of which being classified in White-Taylor-type (phase transition); (5) combination with STN crystal; and (6) combination with ferroelectric liquid crystal (FLC). Guest-host (GH) mode display is also available, and "Hansha-gata Kara LCD Sogo Gijutsu (General Technologies of Reflection-type Color LCD)", supervised by Tatsuo Uchida, published by CMC, 1999, Chapter 2-1 "GH-mode, Reflective mode Color LCD", p. 15-16 describes specific examples thereof, which include those of (1) Heilmeier mode, (2) quarter-wave plate mode, (3) double layer mode, (4) phase transition mode, and (5) polymer-dispersed liquid crystal (PDLC) mode.

The liquid crystal cell of the present invention may be applied in a liquid crystal display of multiple layered GH mode such as disclosed in JP-A-10-67990, JP-A-10-239702, JP-A-10-133223, JP-A-10-339881, JP-A-11-52411, JP-A-

11-64880 and JP-A-2000-221538(the term "JP-A" as used herein means an "unexamined published Japanese patent application"), and in a liquid crystal display of GH mode using microcapsules such as disclosed in JP-A-11-24090. Furthermore, the liquid crystal cell may be applied in a reflective mode liquid crystal display such as disclosed in JP-A-6-235931, JP-A-6-235940, JP-A-6-265859, JP-A-7-56174, JP-A-9-146124, JP-A-9-197388, JP-A-10-20346, JP-A-10-31207, JP-A-10-31216, JP-A-10-31231, JP-A-10-31232, JP-A-10-31233, JP-A-10-31234, JP-A-10-82986, JP-A-10-90674, JP-A-10-111513, JP-A-10-111523, JP-A-10-123509, JP-A-10-123510, JP-A-10-206851, JP-A-10-253993, JP-A-10-268300, JP-A-11-149252 and JP-A-2000-2874; and in a liquid polymer-dispersed liquid crystal (PDLC) mode such as disclosed in JP-A-5-61025, JP-A-5-265053, JP-A-6-3691, JP-A-6-23061, JP-A-5-203940, JP-A-6-242423, JP-A-6-289376, JP-A-8-278490 and JP-A-9-813174.

The liquid crystal composition of the present invention is also applicable to spatial light modulator, and liquid crystal display of optically-addressed or thermally-addressed type.

EXAMPLES

The present invention will be specifically explained with reference to the following examples. The materials, regents, ratios, procedures and so forth shown in the following examples can be optionally changed so long as such change does not depart from the spirit of the present invention. Therefore, the scope of the present invention is not limited by the following examples.

Example 1

Exemplary Synthesis of Compound (2)

Compound (2) was synthesized according to the following route.

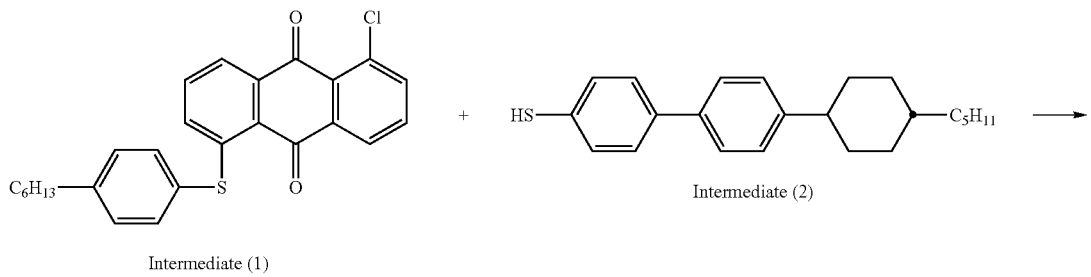

Intermediate (1)

Intermediate (2)

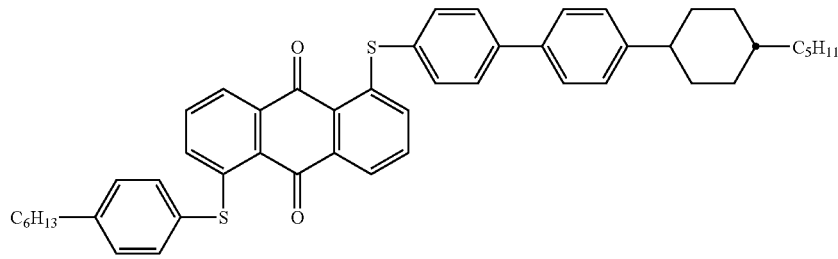

Compound (2)

50 ml of dimethylamide was added to a mixture containing 5 g of Intermediate (1), 4.2 g of Intermediate (2) and 3.4 g of potassium carbonate, and the obtained mixture was stirred for 2 hours at 100° C. The reaction mixture was cooled to room temperature, added with water, organic components contained therein was then extracted with chloroform. The volatile component in the chloroform phase was removed by distillation in vacuo, and the obtained residue was purified by silica gel chromatography (eluted with chloroform-hexane), to thereby obtain 5.6 g of target Compound (2) as yellow powders. Properties of obtained Compound (2) are listed below.

m.p. 207-209° C.

H-NMR(CDCl$_3$): 8.15(2H,m), 7.69(4H,dd), 7.58(2H,d), 7.53(2H,d), 7.48(2H,d), 7.33(4H,m), 7.18(1H,dd), 7.09(1H, dd), 2.69(2H,t), 2.54(1H,tt), 1.92(4H,m), 1.68(2H,m), 1.50 (1H,m), 1.18-1.42(16H,m), 1.09(2H,m), 0.90(6H,m).

Example 2

Exemplary Synthesis of Compound (39)

Compound (39) was synthesized according to the following route.

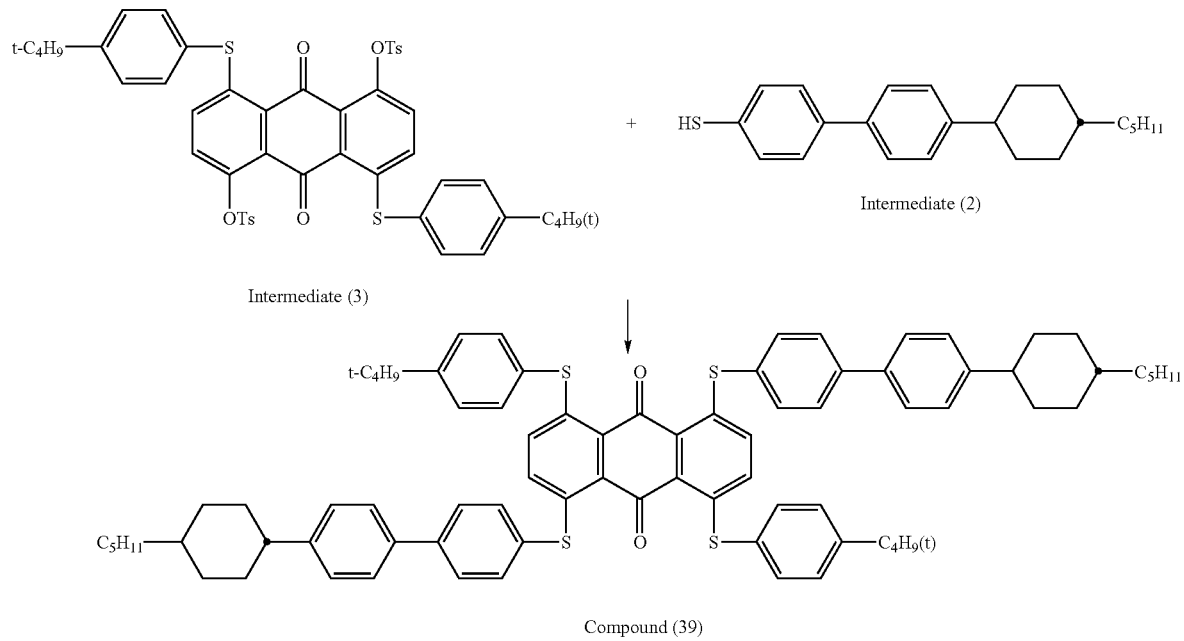

Intermediate (3)

Intermediate (2)

Compound (39)

50 ml of dimethylamide was added to a mixture containing 3.8 g of Intermediate (3), 3.3 g of Intermediate (2) and 6.3 g of potassium carbonate, and the obtained mixture was stirred for 2 hours at 100° C. The reaction mixture was cooled to room temperature, added with water, organic components contained therein was then extracted with chloroform. The volatile component in the chloroform phase was removed by distillation in vacuo, and the obtained residue was purified by silica gel chromatography (eluted with chloroform-hexane), to thereby obtain 1.1 g of target Compound (39) as purplish red colorpowders. Properties of obtained Compound (39) are listed below.

m.p. 300° C. or above.

NMR(CDCl$_3$): 7.63(8H, br), 7.47-7.56(8H, m), 7.43(4H, d), 7.29(4H, d), 6.93(4H, m), 2.51(2H, m), 1.91(8H, m), 1.43-1.53(2H, m), 1.16-1.43(38H, m), 1.07(4H, m), 0.91 (6H, t).

Example 3

Exemplary Synthesis of Compound (33)

Compound (33) was synthesized according to the following route.

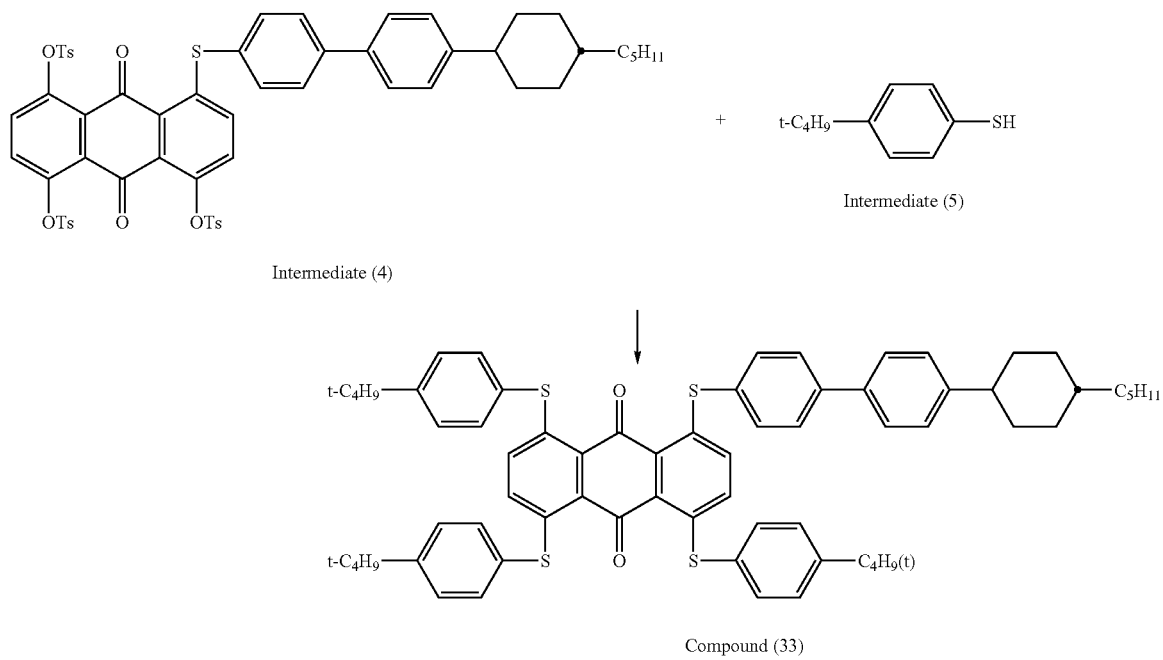

Intermediate (4)

Intermediate (5)

Compound (33)

200 ml of dimethylamide was added to a mixture containing 2.0 g of Intermediate (4), 1.1 g of Intermediate (5) and 2.7 g of potassium carbonate, and the obtained mixture was stirred for 2 hours at 100° C. The reaction mixture was cooled by room temperature, added with water, organic components contained therein was then extracted with chloroform. The volatile component in the chloroform phase was removed by distillation in vacuo, and the obtained residue was purified by silica gel chromatography (eluted with chloroform-hexane), to thereby obtain 1.7 g of target Compound (33) as purplish red color powders. Properties of obtained Compound (33) are listed below.

m.p. 272° C.

NMR(CDCl$_3$): 7.65(4H, s), 7.57-7.36(16H, m), 6.92(4H, s), 2.51(1H, m), 1.91(4H, m), 1.43-1.53(1H, m), 1.16-1.43 (27H, m), 1.07(2H, m), 0.91(3H, t).

Example 4

Exemplary Synthesis of Compound (85)

Compound (85) was synthesized according to the following route.

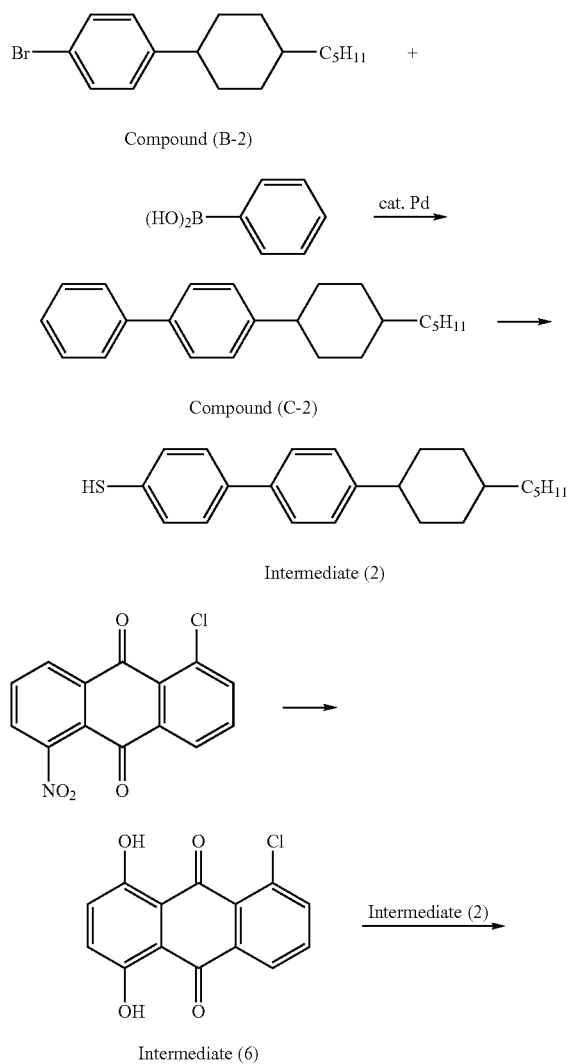

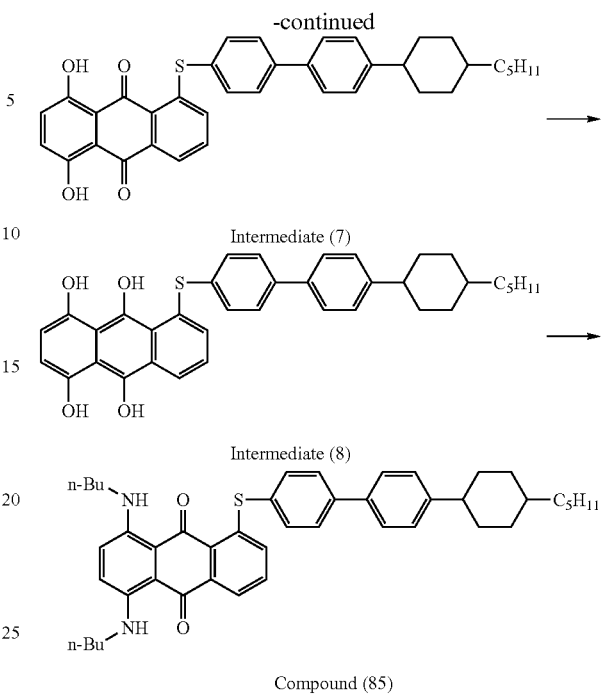

(Exemplary Synthesis of Compound (C-2))

A mixture 61.9 g of Compound (B-2) (provided by Kanto Kagaku), 34.2 g of Phenylboronic acid (provided by Tokyo Kasei Kogyo Co., Ltd.), 10.5 g of triphenyl phosphine, 4.49 g of palladium acetate and 260 g of potassium carbonate was treated with a mixture of 1.2 L toluene and 0.6 L of water at 100° C. on an oil bath for 2 hours under stirring and a nitrogen atmosphere. The obtained reaction solution was cooled to room temperature, filtered through Celite, and organic component contained therein was extracted with ethyl acetate. The volatile component in the ethyl acetate phase was removed by distillation in vacuo, and the obtained residue was purified by silica gel chromatography (eluted with hexane), to thereby obtain 47.6 g (in a 78% yield) of target Compound (C-2) as colorless crystals.

(Exemplary Synthesis of Intermediate (2))

15.2 mL of chlorosulfonic acid was added to 200 mL of methylene chloride solution containing 51.6 g of Compound (2), the obtained mixture was stirred for 45 minute, and throughout the adding and stirring, an inner temperature was kept between 10 to 15° C. After 28 mL of chloroform and 84 mL of N,N-dimethylacetamide were added to the reaction solution, 31.4 mL of phosphorus oxycloride was added dropwise to the reaction solution, and then the inner temperature of the reaction solution raised to 40° C. The obtained reaction solution was stirred for an hour at 40° C. of the inner temperature, poured into 136 g of ices, and 25 mL of concentrated sulfuric acid was added dropwise to the reaction solution. 40.4 g of zinc was added slowly to the reaction solution heated to 20° C. of the inner temperarute with stirring and the solution was stirred for 3 hours at 80° C. of the inner temperature. Ethyl acetate was added to the obtained reaction solution cooled to room temperature, and the inorganic component contained therein was removed by filtration and the organic component contained therein was extracted by ethyl acetate. The volatile component in the ethyl acetate phase was removed by distillation in vacuo, and the obtained residue was purified by silica gel chromatography (eluted with chloroform), to thereby obtain 29.5 g (in a 54% yield) of target Intermediate (2) as colorless crystals (showing m.p. 133° C.).

(Exemplary Synthesis of Intermediate (6))

2.9 g of sodium nitrite and 4.7 g of boric acid were added to 100 ml of a sulfuric acid solution containing 10.0 g of 1-chloro-5-nitoroanthraquinone, which was synthesized based on a method disclosed in U.S. Pat. No. 2,417,027, and the obtained mixture was heated to outer temperature of 200° C. on an oil bath for 4 hours under stirring. The obtained reaction solution was poured into ice water, to thereby yield products as crude crystal. The crude crystal was purified by silica gel chromatography, to thereby obtain 64.5 g of Intermediate (6).

(Exemplary Synthesis of Intermediate (7))

50 ml of dimethylformamide solution containing 1.0 g of Intermediate (2), 2.5 g of Intermediate (6) and 3.5 g of potassium carbonate was heated to outer temperature of 150° C. on an oil bath for 7 hours under stirring. The obtained reaction solution was poured into dilute hydrochloric acid, to thereby yield products as crude crystal. The crude crystal was purified by silica gel chromatography, to thereby obtain 2.5 g of Intermediate (7) as orange crystal.

(Exemplary Synthesis of Intermediate (8))

1.9 g of tin was added to a mixture containing 1.0 g of Intermediate (7), 32 ml of acetic acid and 5.5 ml of hydrochloric acid, and the obtained mixture was heated to outer temperature of 120° C. on an oil bath for 18 hours under stirring. Water was added to the obtained reaction solution, to thereby yield products as crude crystal. The crude crystal was purified by silica gel chromatography, to thereby obtain 0.6 g of Intermediate (8).

(Exemplary Synthesis of Intermediate (85))

A mixture containing 0.2 g of Intermediate (8) and 10 ml of ethanol solution containing 1 ml of buthylamine was refluxed with stirring for 18 hours. The obtained reaction solution was poured into dilute hydrochloric acid, to thereby yield products as crude crystal. The crude crystal was purified by silica gel chromatography, to thereby obtain 0.12 g of Compound (85) as blue crystal.

Absorption maximum=610 nm and 670 nm (in chloroform)

The intensity of an absorption peak at 450 nm is 2% of that at 670 nm, it suggests that Compound (85) is a cyan dye which exhibits a much weak counter-absorption at yellow range.

Example 5

Each of the compounds (some are compounds of the present invention, and another are comparative compounds) listed in Table 1 below in an amount of 1.0 mg was mixed with each 50 mg, 200 mg and 100 mg of a liquid crystal ZLI-1132 (trade name, a product of E. Merck), and the mixtures were heated to 80° C. and subsequently cooled to room temperature. According to observation how each compounds was dissolved in liquid crystal, the solubilities of compounds were listed in Table 1. ">2%" means that compounds were fully dissolved in 50 mg, "1-2%" means that compounds were dissolved in 100 mg and not fully in 50 mg, "0.5-1%" means that compounds were fully dissolved in 200 mg and not fully in 100 mg, and "<0.5%" means that compounds were not fully dissolved in even 200 mg and insoluble matter were found in liquid crystal. Samples having highest concentration of each compounds listed in Table 1 were used for producing liquid crystal cells as liquid crystal components.

Each of obtained liquid crystal compositions was then filled in a commercial liquid crystal cell to thereby fabricate a guest-host-type liquid crystal cell or a comparative liquid crystal cell. Each of liquid crystal cells employed herein was a product of E. H. C. Corporation, which comprises a pair of glass plates (0.7 mm thick) having formed thereon ITO transparent electrode layers and polyimide alignment films (patterned in parallel by rubbing treatment), has a cell gap of 8 μm, and has a epoxy resin seal.

Each of thus fabricated liquid crystal cells was respectively irradiated with polarized lights in parallel to and perpendicular to the direction of rubbing, and respective absorption spectra (A∥ and A⊥) were measured using a spectrophotometer Model UV3100 (product of Shimadzu Corporation). Based on A∥ and A⊥, the order parameter S was calculated using the equation 1 below. Thus calculated order parameters S were listed in Table 1 together with absorption maximum wavelengths ($\lambda_{max}$) and solubilities.

$$S=(A\|-A\bot)/(A\|+2\times A\bot) \quad \text{quation 1}$$

TABLE 1

| Anthraquinone Compound | Solubility | λmax (nm) | Order Parameter S |
|---|---|---|---|
| Compound (1) | >2% | 455 | 0.82 |
| Compound (2) | >2% | 455 | 0.83 |
| Compound (3) | >2% | 450 | 0.81 |
| Compound (14) | 1-2% | 450 | 0.87 |
| Compound (16) | >2% | 455 | 0.81 |
| Compound (17) | >2% | 455 | 0.82 |
| Compound (24) | >2% | 470 | 0.81 |
| Compound (27) | >2% | 520 | 0.81 |
| Compound (39) | 1-2% | 550 | 0.81 |
| Compound (43) | >2% | 550 | 0.82 |
| Compound (46) | 1-2% | 550 | 0.81 |
| Compound (54) | >2% | 660 | 0.82 |
| Compound (63) | >2% | 455 | 0.84 |
| Compound (85) | >2% | 670 | 0.81 |
| Comparative Compound (1) | 0.5-1% | 600 | 0.8 |

TABLE 1-continued

| Comparative Compound (2) | 0.5-1% | 455 | 0.77 |
| Comparative Compound (3) | 1-2% | 455 | 0.73 |
| Comparative Compound (4) | 0.5-1% | 555 | 0.75 |

Comparative Compound (1)

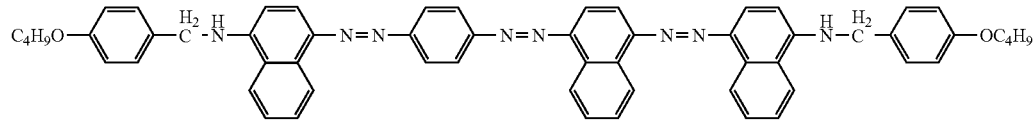

(This is disclosed in JP-A-59-22964 as Compound 99.)

Comparative Compound (2)

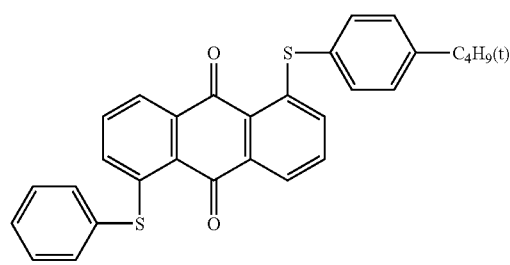

(This is disclosed in JP-A-62-64886 as a compound represented by formula (III).)

Comparative Compound (3)

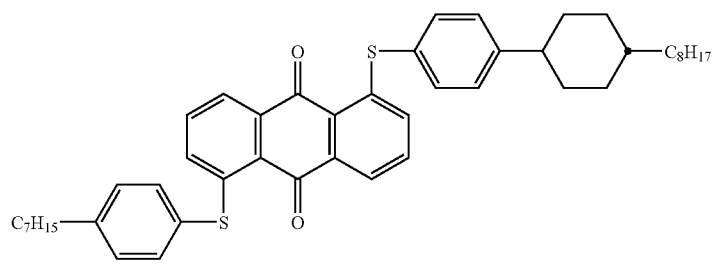

(This is disclosed in JP-A-2-178390 as Compound I-8.)

Comparative Compound (4)

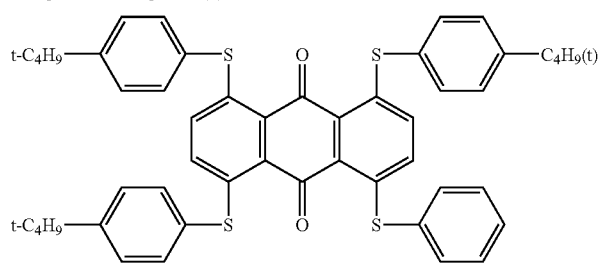

This is disclosed in JP-A-10-260386 as Compoud IV-2.)

As shown data in Table 1, the compounds of the present invention exhibit not only large order parameters but also high solubilities. On the other hand, none of Comparative compounds can achieve a balance between large order parameter and high solubility like the compounds of the present invention. To put it concretely, Comparative compound (1) exhibits a relatively large parameter, but a low solubility; Comparative compound (3) exhibits a relatively high solubility, but a small order parameter; and Comparative compound (2) and (4) exhibit small parameters and low solubilities.

INDUSTRIAL APPLICABILITY

The present invention as described above can provide a liquid crystal composition and a liquid crystal cell which can contribute to improvement of displaying contrast and bring about high optical density, when employed in displaying devices. The present invention can also provide novel anthraquinone dyes which are useful as dichroic dyes, and in especial novel anthraquinone dyes bringing about high order parameters and having high solubilities for host crystal liquid.

The invention claimed is:

1. The liquid crystal composition comprising at least one liquid crystal compound and at least one anthraquinone compound represented by formula (2) below:

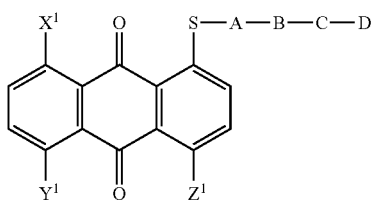

Formula (2)

where S is a sulfur atom; A, B and C each independently represents an optionally substituted arylene, heteroarylene or cyclohexandiyl; D is an optionally substituted alkyl, cycloalkyl, alkoxy, alkoxycarbonyl or acyloxy; $X^1$ and $Z^1$ each independently represents a hydrogen atom, halogen atom, hydroxyl, optionally substituted amino, arylthio or heteroarylthio, and $Y^1$ represents a hydrogen atom, halogen atom, hydroxyl, optionally substituted amino or arylthio provided $X^1$, $Y^1$ and $Z^1$ are not all hydrogen.

2. The liquid crystal composition of claim 1, wherein the anthraquinone compound is represented by formula (3) below:

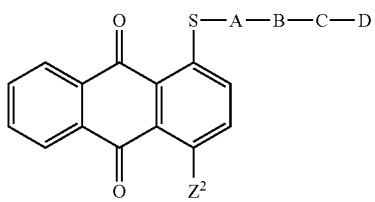

Formula (3)

where S is a sulfur atom; A, B and C each independently represents an optionally substituted arylene, heteroarylene or cyclohexandiyl; D is an optionally substituted alkyl, cycloalkyl, alkoxy, alkoxycarbonyl or acyloxy; and $Z^2$ represents an optionally substituted arylthio or heteroarylthio.

3. The liquid crystal composition of claim 1, wherein the anthraquinone compound is represented by formula (4) below:

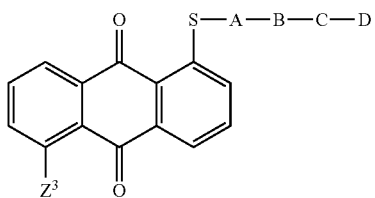

Formula (4)

where S is a sulfur atom; A, B and C each independently represents an optionally substituted arylene, heteroarylene or cyclohexandiyl; D is an optionally substituted alkyl, cycloalkyl, alkoxy, alkoxycarbonyl or acyloxy; and $Z^3$ represents an optionally substituted arylthio.

4. The liquid crystal composition of claim 1, wherein the anthraquinone compound is represented by formula (5) below:

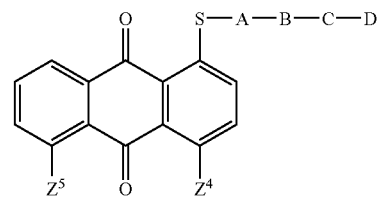

Formula (5)

where S is a sulfur atom; A, B and C each independently represents an optionally substituted arylene, heteroarylene or cyclohexandiyl; D is an optionally substituted alkyl, cycloalkyl, alkoxy, atkoxycarbonyl or acyloxy; $Z^4$ represents an optionally substituted arylthio or heteroarylthio; and $Z^5$ represents an optionally substituted arylthio.

5. The liquid crystal composition of claim 1, wherein the anthraquinone compound is represented by formula (6) below:

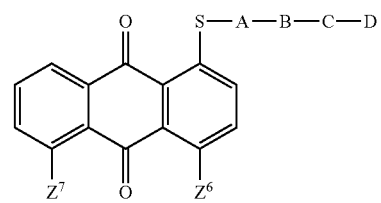

Formula (6)

where S is a sulfur atom; A, B and C each independently represents an optionally substituted arylene, heteroarylene or cyclohexandiyl; D is an optionally substituted alkyl, cycloalkyl, alkoxy, alkoxycarbonyl or acyloxy; $Z^6$ and $Z^7$ each independently represents an optionally substituted arylthio.

6. The liquid crystal composition of claim 1, wherein at least one of $Z^1$, $X^1$ and $Y^1$ represents an alkylamino.

7. The liquid crystal composition of claim 1 wherein the liquid crystal compound is at least one fluorine-containing liquid crystal.

8. The liquid crystal composition of claim 1, wherein the content of the compound represented by the formula (1) is 0.1 to 15 wt % based on the total weight of the liquid crystal composition.

9. A liquid crystal cell comprising a liquid crystal layer containing a liquid crystal composition of claim 1.

10. The liquid crystal cell of claim 9, which is a guest-host mode liquid crystal cell.

11. A display device comprising a liquid crystal cell comprising a liquid crystal layer containing a liquid crystal composition of claim 1.

12. The display device of claim 11, wherein the liquid crystal cell is a guest-host mode liquid crystal cell.

13. A compound represented by formula (1-a) below:

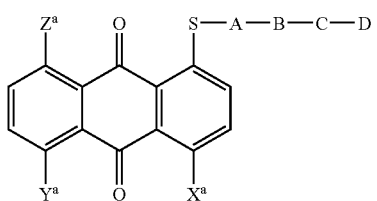

Formula (1-a)

where S is a sulfur atom; A, B and C each independently represents an arylene, heteroarylene or cyclohexandiyl, wherein said arylene, heteroarylene or cyclohexandiyl may have substituent(s); D represents an optionally substituted alkyl, cycloalkyl, alkoxy, alkoxycarbonyl or acyloxy; $X^a$ and $Z^a$ each independently represents a hydrogen atom, optionally substituted amino, arylthio or heteroarylthio, $y^a$ represents a hydrogen atom, optionally substituted amino or arylthio; provided at least one of $X^a$, $y^a$ and $Z^a$ represents an optionally substituted arylthio, wherein the -A-B-C- structure is connected through a single bond without any linking group between the rings.

14. The compound of 13, wherein $X^a$ and $Z^a$ are hydrogen, and $y^a$ is an arylthio which may have substituent(s).

15. The compound of claim 13, wherein $X^a$, $y^a$, and $Z^a$ each independently represents an arylthio which may have substituent(s).

16. The compound of claim 13, wherein $y^a$ and $Z^a$ are each independently alkylamino or arylamino which may have substituent(s), and $X^a$ is a hydrogen atom or an arylthio which may have substituent(s).

17. The liquid crystal composition of claim 3 wherein A and B each independently represents an optionally substituted arylene; C represents an optionally substituted cyclohexandiyl; and D represents an optionally substituted alkyl.

18. The compound of 13, wherein A and B each independently represents an arylene which may have substituent(s); C represents an cyclohexandiyl which may have substituent(s); and D represents an optionally substituted alkyl.

19. The compound of claim 13, wherein A, B and C each independently represents a phenylene, naphthylene, anthrathenylene, pyridin-diyl, quinolin-diyl, isoquinolin-diyl, pyrimidylene, pyrazin-diyl, thiophenylene, furanylene, oxazolylene, thiazolylene, imidazolylene, pyrazolylene, oxadiazolylene, thiadiazolylene, triazoylenephenylene, a bivalent group of fused aromatic rings formed or by condensation thereof or (E)-cyclohexan-1,4-diyl, which may have substituent(s).

* * * * *